United States Patent
Glimpel et al.

(10) Patent No.: US 9,662,728 B2
(45) Date of Patent: May 30, 2017

(54) METHOD AND TOOL FOR PRODUCING A THREAD IN A WORKPIECE

(71) Applicants: EMUGE-Werk Richard Glimpel GmbH & Co. KG Fabrik fuer Praezisionswerkzeuge, Lauf a.d. Pegnitz (DE); Audi AG, Ingolstadt (DE)

(72) Inventors: Helmut Glimpel, Lauf a.d. Pegnitz (DE); Dietmar Hechtle, Pegnitz (DE); Peter Kopton, Koesching (DE)

(73) Assignees: EMUGE-WERK RICHARD GLIMPEL GMBH & Co. KG Fabrik Fuer Praezisionswerkzeuge, Lauf an der Pegnitz (DE); AUDI, AG, Ingolstadt (DE)

( * ) Notice: Subject to any disclaimer, the term of this patent is extended or adjusted under 35 U.S.C. 154(b) by 31 days.

(21) Appl. No.: 14/407,830

(22) PCT Filed: Jun. 10, 2013

(86) PCT No.: PCT/EP2013/061906
§ 371 (c)(1),
(2) Date: Dec. 12, 2014

(87) PCT Pub. No.: WO2013/186165
PCT Pub. Date: Dec. 19, 2013

(65) Prior Publication Data
US 2015/0125229 A1     May 7, 2015

(30) Foreign Application Priority Data
Jun. 14, 2012   (DE) .................... 10 2012 105 183

(51) Int. Cl.
*B23G 5/20*   (2006.01)
*B23G 5/06*   (2006.01)
(Continued)

(52) U.S. Cl.
CPC ............. *B23G 5/20* (2013.01); *B23G 5/04* (2013.01); *B23G 5/06* (2013.01); *B23G 7/02* (2013.01);
(Continued)

(58) Field of Classification Search
CPC ... B23G 5/06; B23G 5/20; B23G 7/02; B23G 2200/48; Y10T 408/9048; Y10T 408/904;
(Continued)

(56) References Cited

U.S. PATENT DOCUMENTS 1,752,262 A * 3/1930 Muhlhoff ................ B23B 51/00
                                                        144/219
1,875,362 A * 9/1932 Wells ...................... B23P 15/48
                                                        408/222
(Continued)

FOREIGN PATENT DOCUMENTS

CN   101804487   8/2010
CN   102773570   11/2012
(Continued)

OTHER PUBLICATIONS

International Preliminary Report on Patentability for PCT/EP2013/061906, Mailed Apr. 12, 2014—English Translation.
(Continued)

*Primary Examiner* — Daniel Howell
*Assistant Examiner* — Chwen-Wei Su
(74) *Attorney, Agent, or Firm* — Workman Nydegger

(57) ABSTRACT

A method for producing a thread can include a) generating a number n≥1 of twisted grooves in a wall of the workpiece encircling a thread axis (M) or generating a wall of the workpiece which has a number n≥1 of twisted grooves and encircles a thread axis, b) respectively inserting a thread generating region of a tool into each of the twisted grooves in a twisted insertion movement, c) generating a thread in
(Continued)

each wall sub-region, adjoining the groove(s), of the wall of the workpiece by rotating the tool about the thread axis (M) and with a simultaneous axial feed motion of the tool coaxially with respect to the thread axis with a particular axial feed speed and d) moving each thread generating region of the tool out of the associated groove in a twisted removal movement matched to the twisting of the associated twisted groove.

20 Claims, 15 Drawing Sheets

(51) Int. Cl.
    *B23G 7/02*     (2006.01)
    *B23G 5/04*     (2006.01)
    *F16B 37/08*     (2006.01)

(52) U.S. Cl.
    CPC ........ *B23G 2210/48* (2013.01); *F16B 37/085* (2013.01); *Y10T 408/03* (2015.01); *Y10T 408/348* (2015.01); *Y10T 408/356* (2015.01); *Y10T 408/9048* (2015.01); *Y10T 409/502624* (2015.01); *Y10T 409/502788* (2015.01); *Y10T 409/503116* (2015.01)

(58) Field of Classification Search
    CPC ............. Y10T 408/348; Y10T 408/356; Y10T 409/502624; Y10T 409/502788; Y10T 409/503116
    USPC .......................... 407/198, 199; 470/198, 199
    See application file for complete search history.

(56) References Cited

U.S. PATENT DOCUMENTS

| | | | | |
|---|---|---|---|---|
| 2,369,273 | A | * | 2/1945 | Bakewell ............... B23D 77/00 407/31 |
| 3,359,581 | A | | 12/1967 | Semediak |
| 4,409,698 | A | * | 10/1983 | Toropov ................... B23G 5/20 470/204 |
| 5,487,626 | A | * | 1/1996 | Von Holst ................ B23G 5/06 408/144 |
| 5,607,005 | A | | 3/1997 | Leibhard |
| 6,217,267 | B1 | * | 4/2001 | Sugano ..................... B23G 7/02 408/220 |
| 6,685,573 | B2 | * | 2/2004 | Hikosaka ................. B23G 7/02 408/222 |
| 8,087,856 | B2 | | 1/2012 | Reed |
| 9,186,739 | B2 | * | 11/2015 | Floeter ..................... B23G 1/16 |
| 2004/0258492 | A1 | * | 12/2004 | Hakansson .............. B23G 7/02 408/222 |
| 2005/0053437 | A1 | * | 3/2005 | Horiuchi ................. B23B 51/08 408/222 |

FOREIGN PATENT DOCUMENTS

| | | |
|---|---|---|
| DE | 1176450 | 8/1964 |
| DE | 102005022503 | 3/2006 |
| DE | 102012110986 | 5/2013 |
| EP | 2218536 | 8/2010 |
| EP | 2522451 | 11/2012 |

OTHER PUBLICATIONS

International Preliminary Report on Patentability for PCT/EP2013/061906, Mailed Apr. 12, 2014.

Chinese Office Action in application No. CN102773570A mailed on Feb. 23, 2016.

* cited by examiner

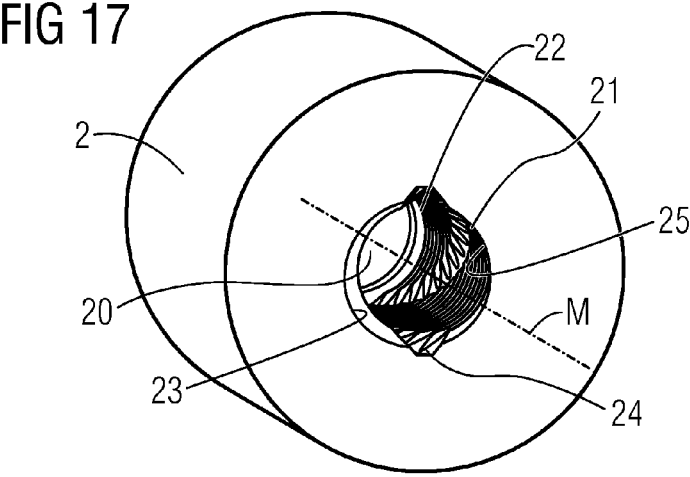
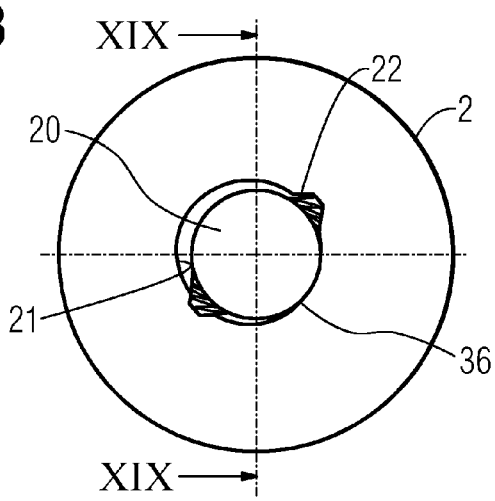
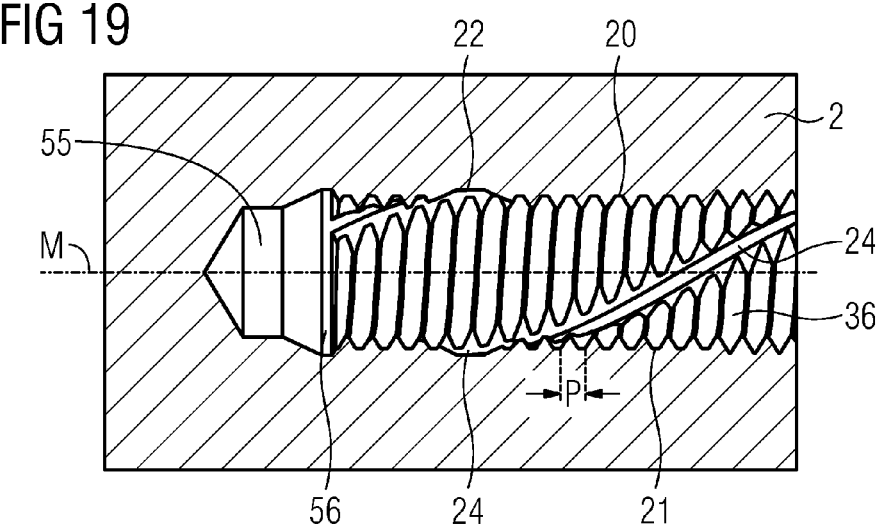

METHOD AND TOOL FOR PRODUCING A THREAD IN A WORKPIECE

CROSS-REFERENCE TO RELATED APPLICATIONS

The present invention is a 35 U.S.C. §371 U.S. National Stage Application corresponding to PCT Application No. PCT/EP2013/061906, filed on Jun. 10, 2013, which claims priority to German Patent Application No. DE 10 2012 105 183.6, filed Jun. 14, 2012. The entire content of each of the aforementioned patent applications is incorporated herein by reference.

BACKGROUND OF THE INVENTION

1. Field of the Invention

The invention relates to a method and to a tool in each case for generating a thread in a workpiece.

2. Background

For thread generation or thread reworking, both cutting and also non-cutting processes and threading tools are known. Cutting thread generation is based on material removal from the workpiece in the region of the thread flight. Non-cutting thread generation is based on deformation of the workpiece and generation of the thread flight in the workpiece by pressure. An overview of thread generating tools and working methods in use is given in Handbuch der Gewindetechnik and Frästechnik [Manual of threading practice and milling practice], publisher: EMUGE-FRANKEN, publishing firm: Publicis Corporate Publishing, year of publication: 2004 (ISBN 3-89578-232-7), designated below only as "EMUGE manual".

Falling within the scope of cutting thread generation are taps (cf. EMUGE manual, chapter 8, pages 181 to 298) and thread milling cutters (cf. EMUGE manual, chapter 10, pages 325 to 372) and also, only for external threads, thread-cutting dies (cf. EMUGE manual, chapter 11, pages 373 to 404).

A tap is a thread-cutting tool whose cutting edges or thread-cutting teeth are arranged along an external thread beneath the thread pitch of the thread to be generated. During the generation of the thread, the tap is moved with a feed motion axially with respect to the tool axis, and whilst being rotated about its tool axis with a rotational speed which is dependent on the axial feed speed in accordance with the thread pitch, into a cylindrical core hole in a workpiece, wherein the tool axis of the tap is oriented coaxially with respect to the central axis of the core hole, and the cutting edges of said tap are permanently in engagement with the workpiece at the core hole wall (continuous cutting), such that a continuous thread flight is generated on the core hole wall.

Falling within the scope of non-cutting thread generating tools are so-called cold-forming taps (cf. EMUGE manual, chapter 9, pages 299 to 324) and, only for external threads, thread-rolling tools (cf. EMUGE manual, chapter 11, pages 373 to 404).

Cold-forming taps are threading tools with an approximately spirally or helically encircling thread profile, along which are arranged a plurality of pressing lobes (also referred to as shaping teeth, cold-forming teeth or shaping wedges) which are formed by generally rounded polygon corner regions, which are offset with respect to one another and project further outward, of an approximately polygonal cross section of the cold-forming tap. During the generation of the thread, the cold-forming tap is, similarly to the tap, moved with a feed motion axially with respect to the tool axis and whilst being rotated about its tool axis into a cylindrical core hole in a workpiece, wherein the tool axis of the tap is oriented coaxially with respect to the central axis of the core hole. The rotational speed and axial feed speed are coordinated with one another in accordance with the thread pitch. The pressing lobes of the cold-forming tap are permanently in engagement with the workpiece at the core hole wall, and press the thread flight into the core hole wall by plastic deformation, such that a continuous thread flight is generated on the core hole wall.

Furthermore, combination tools which operate exclusively by cutting processes and which are composed of drills and thread milling cutters are known, specifically so-called drill thread milling cutters (cf. EMUGE manual, chapter 10, page 354) and so-called circular drill thread milling cutters (cf. EMUGE manual, chapter 10, page 355), by means of which firstly the core hole for the thread can be generated, and then the thread can be generated in the core hole.

The tool shank of the specified thread generating tools is generally of at least approximately cylindrical form about its longitudinal axis and/or is received and held with its end facing away from the workpiece in the chuck of a machine tool. The direction of rotation of taps and cold-forming taps during the generation of the thread corresponds to the turning direction of the thread to be generated. The known screws or screw threads screwed into the generated internal thread comprise continuous helical external threads which are complementary to the internal threads.

DE 1 176 450 discloses a method for producing internal threads in sheet metal or similar workpieces, said method comprising the following method steps:

1. punching out a hole which is round per se and has a plurality of uniformly distributed cutouts,
2. inserting a tap, the number of cutting ridges of which corresponds to the number of cutouts,
3. rotating the tap through an angle which corresponds to the angle between two cutouts,
4. pulling out the tap.

In this known method, as indicated in DE 1 176 450, a tap, a non-cutting tap or a similar tool produces the thread by only partial rotation. When using a composite tool, it is possible in accordance with DE 1 176 450 to already form these internal threads as the part is being punched, it being possible for a plurality of internal threads to be produced at the same time even with different outer diameters and pitches. Production by a separate operation can be performed manually using a punching tool or a simple apparatus.

U.S. Pat. No. 3,359,581 discloses a method for producing threads in which a workpiece has one or two axial grooves and a thread generating tool has axial thread generating regions which are inserted coaxially into the grooves of the workpiece. Then, a thread is generated in the workpiece between the grooves by rotation through one turn in the case of one groove and through a half turn in the case of two grooves with the thread generating regions of the thread generating tool, and the thread generating tool is then axially removed again from the workpiece. The workpiece can have a core hole with two diametrically protruding grooves or else can be a cylindrical bolt with two diametric grooves. In the first case, the thread generating tool is a tap or thread-cutting tool having two thread-cutting ridges running axially diametrically opposite one another, and in the second case is a thread-cutting tool similar to a thread-cutting die having axially opposing, inwardly protruding thread-cutting ridges.

EP 2 218 536 A1 discloses a method for forming an internal thread on a main body, wherein firstly a threading tool having at least one portion with thread-forming means in certain regions is inserted into an opening in the main body, and then the entire internal thread is formed in the main body by a rotation of the threading tool through at most 360°. The threading tool has a plurality of portions with thread-forming means arranged in a symmetry of rotation of an integral order, and the threading tool is rotated through an angle of rotation which corresponds to the value of the quotient of a full circle divided by the number of portions with the thread-forming means of the threading tool. Before the threading tool is inserted, provision is made of recesses which are arranged in the inner wall of the main body in a symmetry of rotation of an integral order, the number of said recesses corresponding to the number of portions with the thread-forming means on the threading tool and the design of said recesses being coordinated with the design of the portions with the thread-forming means on the threading tool. In particular, provision is made of four recesses and four corresponding thread ridges on the threading tool.

BRIEF SUMMARY OF THE INVENTION

It is therefore an object of the invention to specify a new method and a new tool in each case for generating a thread.

This object is achieved in terms of the method by the features of claim 1 and in terms of the tool by the features of claim 10. Advantageous embodiments and refinements of the method or tool according to the invention emerge from the patent claims which are dependent on patent claim 1 and patent claim 10, respectively.

The method as claimed in claim 1 for producing a thread in a workpiece comprises the following method steps:

a) generating a number $n \geq 1$ of twisted grooves in a wall of the workpiece encircling a thread axis or generating a wall of the workpiece which has a number $n \geq 1$ of twisted grooves and encircles a thread axis, b) respectively inserting a thread generating region of a tool which is twisted to match the twisting of the twisted grooves into each of the twisted grooves in a twisted insertion movement matched to the twisting of the associated groove, c) generating a thread in each wall sub-region, adjoining the groove(s), of the wall of the workpiece by rotating the tool about the thread axis and with a simultaneous axial feed motion of the tool coaxially with respect to the thread axis with an axial feed speed adapted to the rotational speed of the rotational movement and to the thread pitch, wherein, during the rotation and the simultaneous axial feed movement, each thread generating region engages into the associated wall sub-region and generates an associated part of a thread flight, and after the rotation projects into the same groove again or into another groove in the wall, d) moving each thread generating region of the tool out of the associated groove in a twisted removal movement matched to the twisting of the associated twisted groove.

The tool as claimed in claim 10 for producing a thread in a workpiece comprises the following features:

a) the tool is rotatable about a tool axis, b) the tool has a number $n \geq 1$ of groove generating regions twisted about the tool axis for generating a respective groove in the workpiece and a number $m \geq 1$, where in particular $n \geq m$, of preferably helical thread generating regions twisted about the tool axis for generating the thread in the workpiece, c) the twisting of the groove generating region(s) and the twisting of the thread generating region(s) are matched to one another, d) each of the m thread generating regions is arranged downstream of one of the n groove generating regions, following the twisting of this groove generating region.

Compared to conventional tapping and thread cold-forming, this method and tool according to the invention can considerably reduce the times for producing the thread. Furthermore, owing to the twisted insertion movement through the grooves, the tool can be guided very quickly from the outside into its working position on the wall of the workpiece m and the thread can then be produced with a significantly smaller angle of rotation or with significantly fewer revolutions, and finally, after the generation of the thread, the threading tool can, owing to the removal movement through the grooves, be guided very quickly to the outside away from the wall of the workpiece. In the case of tapping or thread cold-forming according to the prior art, it is always the case that multiple revolutions of the tap or of the cold-forming tap are required, specifically firstly during the turning-in process and then once again during the turning-back process of the tool. In the case of the method and tool according to the invention, one revolution, or even only part of one revolution, is sufficient, corresponding to the number and arrangement of the grooves in combination with the twisted feed and removal movements. Here, the additional time required for the generation of the grooves is considerably shorter than the time saving during the thread generation. Furthermore, according to the invention, the thread can be formed in accurately in terms of its axial position and with regard to the start of the thread. The grooves constitute defined positions for the thread.

The combined tool according to the invention is intended with preference for use in the method according to the invention. It allows for grooves and threads to be produced in one working step or using only one tool, and this reduces the process times further.

The grooves and the thread can also be generated using separate tools in successive working steps, however.

Compared to the straight grooves known from the cited prior art documents DE 1 176 450, U.S. Pat. No. 3,359,581 and EP 2 218 536 A1, the generation of twisted grooves has the advantage that the axial forces required for generating the grooves are reduced. Owing to the twisting, a torque is superposed on the axial force, and this has a damping effect on the axial loading of a tool spindle with which the tool is driven. In the generation of grooves by cutting, it is moreover the case that the chips generated can be carried away more effectively forward into the twisted grooves.

The groove twist pitch of the grooves is preferably chosen to be considerably greater than the thread pitch, generally at least four times greater, in particular at least six times greater, preferably at least eighteen times greater or even at least thirty-six times greater.

As an alternative or in addition, the thread pitch angle is chosen to be considerably greater than the groove twist angle, in particular more than two times greater and preferably more than four times greater than the groove twist angle, the angles being measured with respect to the thread axis and tool axis, respectively. It is usually the case that the thread pitch angle is considered in relation to the normal plane with respect to the axis, but for the sake of better comparability the groove twist angle and the thread pitch angle are defined in relation to the same reference axis in the present application It is thereby possible to ensure a considerable reduction in process time compared to conventional tapping or thread cold-forming, with a simultaneous reduction of axial forces during the groove generation.

The groove twist angle preferably lies in absolute terms in a range between 2° and 70°, in particular between 5° and 45° and preferably between 7° and 25°.

The thread pitch angle generally lies between 80° and 89.5°, preferably between 85° and 89°.

The twisting directions or turning direction of grooves and threads about the thread axis can be the same, i.e. both to the right or both to the left about it, or else can be opposite to one another, i.e. one to the right and one to the left about it.

If the thread is generated with a feed motion of the combined tool in a direction toward the workpiece, i.e. in the forward movement, an identical turning direction of thread and groove is advantageous, and if the thread is generated with a feed motion of the tool in a direction away from the workpiece, i.e. in the backward movement, an opposing turning direction of thread and groove is advantageous, since then in both cases the tool can be rotated in the same direction of rotation during groove generation and during thread generation.

In a particularly advantageous embodiment of the method, the tool is rotated about a predefined angle of rotation during the generation of the thread, this angle of rotation being chosen or set in accordance with one of the following provisions or a combination thereof:
  a) as a sum of an angular interval between two grooves, preferably two directly adjacent grooves, on the one hand and a correction term which is proportional to the quotient of the thread pitch of the thread to be generated and the difference between the twist pitch of the grooves and the thread pitch of the thread to be generated, the thread pitch and the twist pitch preferably being chosen to be positive in the case of a right-handed thread or a right-handed twist and to be negative in the case of a left-handed thread or left-handed twist, on the other hand,
  b) to such a value that after the rotation each thread generating region projects into a groove which is directly adjacent to the groove into which the thread generating region projects before the rotation,
  c) given an equidistant arrangement or generation of the n grooves in the same angular interval of 360°/n in relation to one another, is obtained as an integral multiple of the sum of 360°/n on the one hand and a correction term which corresponds to the product of 360°/n on the one hand and the quotient of the thread pitch of the thread to be generated and the difference between the twist pitch of the grooves and the thread pitch of the thread to be generated, on the other hand, the thread pitch (P) and the twist pitch (PN) preferably being chosen to be positive in the case of a right-handed thread or a right-handed twist and to be negative in the case of a left-handed thread or left-handed twist.

The angle of rotation correction term corrects the longer (or shorter) path of rotation for the thread generation in the case of twisted grooves compared to straight axial grooves.

In a preferred and expedient embodiment, each twisted groove or each thread generating region runs substantially helically about the thread axis during the generation of the thread, preferably on a cylindrical surface or else a cone.

Furthermore, each groove and each thread generating region preferably have the same twisting both with respect to the direction in which they turn about the thread axis or tool axis and with respect to the twist pitch or the twist angle.

The groove(s) can be generated by cutting processes or else by non-cutting processes using correspondingly cutting or non-cutting groove generating tools or groove generating regions of the combined tool.

In a preferred variant, at least some of the n groove generating regions of a groove generating tool or of the combined tool are formed as cutting groove generating regions with groove generating cutting edges, wherein the groove generating cutting edges are formed in particular as reaming cutting edges and/or are arranged on a face side of the tool.

At least some of the cutting groove generating regions and/or groove generating cutting edges may have, in an axial direction or twisting direction and/or in a circumferential direction, in each case at least one step or edge which is provided in particular as a chip-splitting step or edge.

In a preferred variant, the or each groove generating region has a groove cutting edge or face cutting edge oriented toward or situated on the face side, wherein said groove cutting edges are generally the radially furthest outward projecting parts of the tool, at least in the front portion thereof.

In one embodiment, the groove cutting edges are of at least approximately circular form and/or the outer radius of the groove cutting edges is greater than the radius of the first thread generating sub-region or of the thread generating region as a whole.

In one embodiment, the or each groove cutting edge is adjoined laterally in a circumferential direction by a side cutting edge, which is at the front in the direction of rotation about the tool axis, and preferably also by a side region which is at the rear in the direction of rotation about the tool axis. During the rotation of the tool in the direction of rotation which takes place for the generation of the thread, the front side cutting edge cuts laterally into the workpiece, wherein there adjoins preferably in a radially inward direction a lateral rake surface. The rear side region is, by contrast, generally at an obtuse angle, that is to say does not have a cutting action and is preferably of convex form.

Axially or in the twisting direction behind the groove cutting edge there generally adjoins a free surface which preferably slopes downward, in particular in a linear or conical fashion, from the outer radius at the groove cutting edge to a radius which is smaller than the radius of the first pressing lobe or of the first thread generating sub-region.

The groove cutting edge is adjoined in a radially inward direction by a face-side rake surface which runs axially or in the twisting direction rearward in a linear or else concave fashion and on which chips produced during the generation, in particular reaming, of the groove with the groove cutting edge are discharged. The face-side rake surface runs preferably from a lowest point axially or in the twisting direction forward again to a planar central region oriented perpendicular to the tool axis, which central region surrounds a central opening of a central duct of the tool, by which central duct coolant and/or lubricant can be supplied.

In a further embodiment, at least some of the n groove generating regions are formed as groove generating regions which operate in a non-cutting manner and/or which operate by plastic deformation or impression of the workpiece material. Each groove generating region preferably has a shaping spine (or: shaping ridge, pressing ridge) which runs substantially in a circumferential direction around the tool axis and which, as viewed in an axial direction or twisting direction, is the radially highest elevation of the groove generating region and/or projects radially furthest outward, and generally also a front surface which is situated in front of the shaping spine in an axial direction or in the twisting direction and which serves as a run-on surface by means of which the groove generating region presses into the workpiece surface for the first time and with slowly increasing deformation force. The front surface connects a front profile, which is situated radially further inward than the shaping spine and which is arranged in particular on the face side of the tool, to the shaping spine in an axial direction. Axially or in the twisting direction behind the shaping spine, each groove generating region has a back surface which slopes downward from the shaping spine in an axial direction or twisting direction and which provides a free space for the flow of workpiece material.

The shaping spine preferably has a maximum which projects radially furthest outward, and said shaping spine slopes downward radially from the maximum in one flank to a first end point which is situated radially further inward than the maximum, and in a further flank to a second end point which is situated radially further inward than the maximum. It is preferably also the case that one end point is situated radially further inward than the other end point and/or one flank of the shaping spine is shorter than the other flank.

The front profile generally has a similar shape to the shaping spine with a maximum and two flanks sloping downward from the maximum to end points, wherein in this case the front surface preferably connects corresponding points and lines, such as corresponding maxima and/or corresponding end points and/or corresponding flanks of the front profile and of the shaping spine, to one another. The front surface preferably runs between the front profile and the shaping spine in an axial direction in a substantially linear or convexly inwardly or outwardly curved manner, or following an arbitrary continuous function.

The grooves can be made subsequently in the wall of the workpiece or else can already be generated together with the wall of the workpiece.

In a preferred embodiment, at least one, preferably each, of the m thread generating regions has, in cross section, a smaller extent in a projection following the twisting than the groove generating region arranged in front of it or upstream. As a result, each thread generating region is at a spacing or a clearance from the groove rim, in particular from the groove base, and can be moved, in particular inserted or removed, in a substantially free manner and with little friction through the groove generated in the workpiece by the groove generating region situated in front.

Particularly upon insertion into the associated groove, the thread generating region projects in a radial direction in relation to the thread axis into the associated groove, maintaining a radial spacing from the groove base and preferably also a spacing from the groove flanks.

In a particular embodiment, however, at least one or each of the m thread generating regions can have, in cross section, at least in part an identical or greater extent in a projection following the twisting than the groove generating region arranged in front of it.

This is particularly expedient when the thread generating region(s) is or are intended to further rework or generate the groove generated by the groove generating region, in particular by non-cutting forming.

A further tool according to the invention which can be combined with all other embodiments is rotatable about a tool axis and has a number $m \geq 1$ of thread generating regions twisted about the tool axis for generating a thread in a workpiece, and comprises a shank, which has a rear portion, which is for example of cylindrical form, and a front portion, which is narrowed in diameter adjacent to the rear portion, and through which the tool axis centrally runs. At the end of the rear portion there is formed a clamping region for the clamping of the shank. The front portion has, toward the face side which faces away from the rear portion or which is arranged at the front, the m thread generating regions. The m thread generating regions are in the form of twisted rows, running in each case in a manner twisted about the tool axis, of thread generating ridges which, in the case of m=2, are arranged preferably diametrically with respect to one another on opposite sides of the tool axis. The thread generating ridges run along the thread pitch of the desired thread and have in each case one pressing lobe, which projects radially furthest outward in relation to the tool axis, for the plastic impression of the thread flight into the workpiece. The outer radii of different thread generating ridges or pressing lobes of the two thread generating regions are equal to one another over the entire length. The thread generating regions are separated by interposed outer surfaces which have a smaller outer radius than the thread generating regions, that is to say are recessed radially with respect to said thread generating regions, and/or form free spaces between the thread generating regions. The thread generating regions preferably cover in each case a first angle range and the outer surfaces cover in each case a second angle range, wherein preferably the first angle range lies in an interval from one to 2.5 times the second angle range and/or wherein the pressing lobes are situated preferably centrally in the respective angle ranges. The outer surfaces have a convex, outwardly directed bulge.

In one embodiment, the n groove generating regions are arranged at uniform angular intervals of 360°/n relative to one another about the tool axis, that is to say they are uniformly distributed. A non-uniform distribution is however also possible.

In one variant of the invention, the angle component of one or each groove generating region and of the thread generating regions, situated therebehind, about the tool axis is between 7.2° and 45°, in particular between 13° and 40° and preferably between 27° and 36°.

The thread generating regions generally project radially further outward than the other outer surfaces of the thread generating tool.

In one variant of the invention, at least one thread generating region is a thread forming (or: cold-forming) region and generates its part of the thread flight by a forming and thus non-cutting process, and/or at least some of the thread generating regions of the thread generating tool have thread pressing lobes arranged on a helical line, which corresponds in terms of thread pitch and turning direction to the thread to be generated, about the tool axis, which thread pressing lobes project radially furthest outward within the thread generating region but project radially outward to a lesser extent than the groove generating region(s). The thread generating regions are in this case in particular derived, in terms of function, from a cold-forming tap.

In a preferred embodiment, at least one thread generating region is a thread cutting region and generates its part of the thread flight by a cutting process. At least some of the thread generating regions of the thread generating tool have thread-cutting teeth arranged on a helical line, which corresponds in terms of thread pitch and turning direction to the thread to be generated, about the tool axis, which thread-cutting teeth project radially furthest outward within the thread generating region but project radially outward to a lesser extent than the groove generating region(s), wherein the thread-cutting teeth are adjoined in a direction opposite to the cutting direction or direction of rotation by preferably outer free surfaces. The thread-cutting teeth have thread cutting edges or a cutting profile which reflect or reflects the cross section of the thread profile of the thread flight to be generated.

In one embodiment, the thread-cutting teeth are arranged and formed so as to cut in the turning direction of the thread to be generated and of the helical line running about the tool axis on which the thread-cutting teeth are arranged. This means that, if the thread to be generated is a right-handed thread, the thread-cutting teeth also cut in a right-handed sense or are likewise right-handed, and if the thread to be generated is a left-handed thread, the thread-cutting teeth also cut in a left-handed sense or are left-handed.

A thread is referred to as being a right-handed thread or right-handed if, as viewed in the direction in which it runs into the workpiece or toward the workpiece, that is to say from the outside to the inside, or away from the viewer, it turns clockwise, that is to say if the turning direction is clockwise or corresponds to a right-handed rotation, and is referred to as being a left-handed thread or left-handed if it turns counterclockwise or in a left-handed rotation, that is to say if the turning direction is counterclockwise. The same nomenclature generally applies to a helical line or helix.

The direction of rotation of the tool and of its thread generating regions during the generation of the thread thus corresponds to the turning direction of the thread, or in other words, in the case of an internal thread, the tool is rotated in the same way as a screw being rotated or screwed into the thread, or in the case of an external thread, the tool is rotated in the same way as a nut being rotated or screwed onto the thread.

In one embodiment, the thread-cutting teeth are arranged and formed so as to cut in the turning direction of the thread to be generated and of the helical line running about the tool axis on which the thread-cutting teeth are arranged. This means that, if the thread to be generated is a right-handed thread, the thread-cutting teeth also cut in a right-handed sense or are likewise right-handed, and if the thread to be generated is a left-handed thread, the thread-cutting teeth also cut in a left-handed sense or are left-handed. The direction of rotation of the tool and of its thread generating regions during the generation of the thread thus corresponds to the turning direction of the thread, or in other words, in the case of an internal thread, the tool is rotated in the same way as a screw being rotated or screwed into the thread, or in the case of an external thread, the tool is rotated in the same way as a nut being rotated or screwed onto the thread. This corresponds to the direction of rotation of a known tap.

In a special alternative embodiment of the invention, the thread-cutting teeth are however arranged and formed so as to cut oppositely to the turning direction of the thread to be generated and of the helical line about the tool axis on which the thread-cutting teeth are arranged.

This is possible owing to the special form of the tool according to the invention, because the thread-cutting teeth can firstly be moved into the workpiece or onto the workpiece through the grooves in the workpiece wall without engaging into the workpiece wall, and can then cut the thread only during the turning-out process, by contrast to known taps which always cut the thread during the turning-in process.

This means, therefore, if the thread to be generated is a right-handed thread, the thread-cutting teeth cut in a left-handed sense or left-handedly, and if the thread to be generated is a left-handed thread, the thread-cutting teeth cut in a right-handed sense or right-handedly. The direction of rotation of the tool and of its thread generating regions during the generation of the thread is therefore specifically opposite to the turning direction of the thread, or in other words, in the case of an internal thread, the tool is rotated in the same way as a screw being screwed out of or unscrewed from the thread, or in the case of an external thread, the tool is rotated in the same way as a nut being screwed off or unscrewed from a thread.

An advantage of the tool according to the invention in relation to known thread-cutting or thread cold-forming tools consists in that the thread generating tool need no longer have a run-on cone or cut-starting region, such as is conventionally provided in the case of taps or cold-forming taps, in which the maximum radial spacing of the thread teeth or pressing lobes increases along a conical surface proceeding from the end of the tap or cold-forming tap. In this way, even in the case of a blind hole, it is possible for a complete thread flight to be generated axially along a greater thread length, because the incomplete thread flight which would arise over the length of the cut-starting region or run-on cone is eliminated.

Furthermore, the thread generating tools may be designed to be shorter, which, aside from other advantages, has a positive effect in particular even in the case of small working heights.

In general, the outer profile of only one thread-cutting tooth or thread shaping wedge already defines the final thread profile of the thread flight portion generated by said tooth or wedge.

In a special refinement, each thread generating region is divided into at least two offset thread generating sub-regions with different thread outer profiles, wherein in particular any desired thread outer profiles may be combined in any desired sequence. In this way, it is possible in particular to set different clamping forces for the screw, which is screwed into a thread generated by means of said thread generating tool, in the different thread sub-regions which correspond to the different thread generating sub-regions. In particular, it is possible to set a greater clamping action for the screwed-in screw in the thread sub-region with the smaller thread profile.

In one advantageous embodiment, a first thread generating sub-region, preferably a front thread generating sub-region, which is situated in front of a rear thread generating sub-region axially or in a direction toward the face side, has a thread outer profile with at least partially smaller dimensions or outer dimensions, in particular at the profile tip but if appropriate also at the profile flanks, than a second thread generating sub-region, preferably the rear thread generating sub-region.

It is then preferably possible for the screw to be screwed initially with a lower clamping action, or more loosely, into the rear thread sub-region generated by the rear thread generating sub-region, before said screw is then screwed further into the front thread sub-region, generated by the front thread generating sub-region, with a greater clamping action or more tightly with a firmer fit.

In one special refinement, each first thread generating sub-region, in particular front thread generating sub-region has, in its thread outer profile, a flattening at the profile tip and/or each second, in particular rear, thread generating sub-region has a thread outer profile which has a radially further outwardly projecting profile tip than the thread outer profile of the first thread generating sub-region, in particular front thread generating sub-region.

In one advantageous embodiment, the diameter of a thread generating sub-region, in particular of the first thread generating sub-region or of the front thread generating sub-region, is smaller than the diameter of another thread generating sub-region, in particular of the second thread generating sub-region or of the rear thread generating sub-region.

Such refinements of the invention would not be technically possible in the case of a known cold-forming tap or tap.

The wall of the workpiece in which the thread is generated is preferably a core hole wall of a core hole, in particular of a blind hole or of a through hole, in the workpiece, such that the thread is an internal thread. The generation of an external thread on an outer wall of the workpiece is however also possible.

The groove generating regions and/or the thread generating regions are fastened, preferably detachably or exchangeably, to a tool carrier or tool shank, preferably as prefabricated parts.

BRIEF DESCRIPTION OF THE DRAWINGS

The invention will be explained in more detail below on the basis of exemplary embodiments. Here, reference is also made to the drawing, in which, in each case schematically:

FIG. 17 shows a perspective illustration of a workpiece with a blind hole having two twisted grooves and having a finished thread between the grooves, wherein the grooves and the thread have been generated preferably by means of a tool as per FIGS. 11 to 15, FIG. 18 shows a plan view of the blind hole as per FIG. 17, FIG. 19 shows a sectional illustration of the blind hole as per FIG. 17 along the line XIX-XIX in FIG. 18.

Corresponding parts and dimensions are denoted by the same reference signs in FIGS. 1 to 22.

DETAILED DESCRIPTION OF THE PREFERRED EMBODIMENTS

Figure 1:
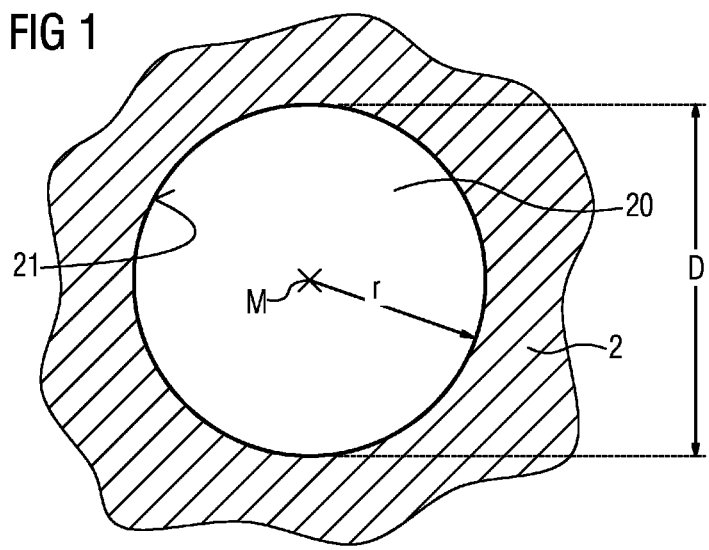
FIG. 1 shows a sectional illustration of a core hole in a workpiece.

FIG. 1 shows a core hole 20 in a workpiece 2 in a section, wherein the core hole 20 has a cylindrical core hole wall 21 which encircles a central axis M and which has the diameter D. The direction radial with respect to the central axis M is denoted by an arrow and the reference sign r.

Figure 2:
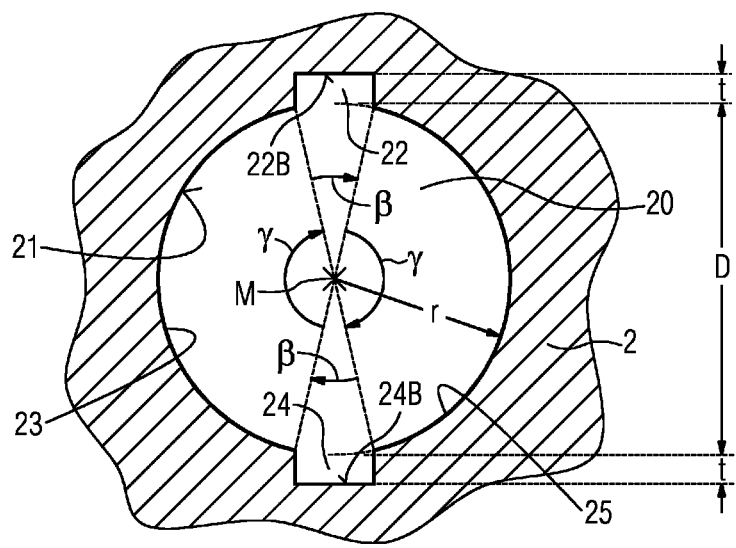
FIG. 2 shows a sectional illustration of the core hole as per FIG. 1 with two grooves generated in a first method step.

According to FIG. 2, there are then generated in the core hole wall 21 two twisted, preferably helical or helix-shaped grooves 22 and 24 which are formed and arranged on opposite sides diametrically with respect to the central axis M, that is to say in particular so as to be offset by 180° with respect to one another. The twisting or the helicity of the grooves 22 and 24 is not actually visible in the pure sectional illustrations as per FIG. 2 and FIGS. 3 to 5, but is in fact indicated graphically in FIG. 5 and can be readily seen, for example, in FIGS. 6 and 8 and also FIGS. 17 and 19, and will be explained in more detail.

The depths of the grooves 22 and 24 measured from the outer diameter or from the original cylindrical core hole wall 21 of the core hole 20 are denoted by t, and are preferably identical in both grooves 22 and 24. The radially outer groove base of the groove 22 is denoted by 22B, and correspondingly, the groove base of the groove 24 is denoted by 24B. A wall sub-region of the core hole wall 21 running counterclockwise between the grooves 22 and 24 in FIG. 2 is denoted by 23, and a wall sub-region situated on the other side between the grooves 22 and 24 is denoted by 25.

The angle component $\beta$, corresponding to the circumferential component, of a groove 22 or 24 in relation to the overall circumference of the core hole 20 and the core hole wall thereof, that is to say in relation to 360°, is between 2% and 12.5%, preferably between 7.5% and 10% or, expressed in degrees, between 7.2° and 45°, preferably between 27° and 36°. The angle component $\gamma$, corresponding to the remaining circumferential component, of each wall sub-region 23 and 25 is then $(360°-2\beta)/2=180°-\beta$.

The core hole 20 as per FIG. 1 is preferably generated by a cutting process, in particular by means of a drilling tool or a milling tool, and the grooves 22 and 24 are then generated in the core hole 20 as per FIG. 2 by means of a separate tool. To generate the two grooves, use can then be made either of a separate groove generating tool or a combined groove and thread generating tool, as will be explained below.

Figure 22:
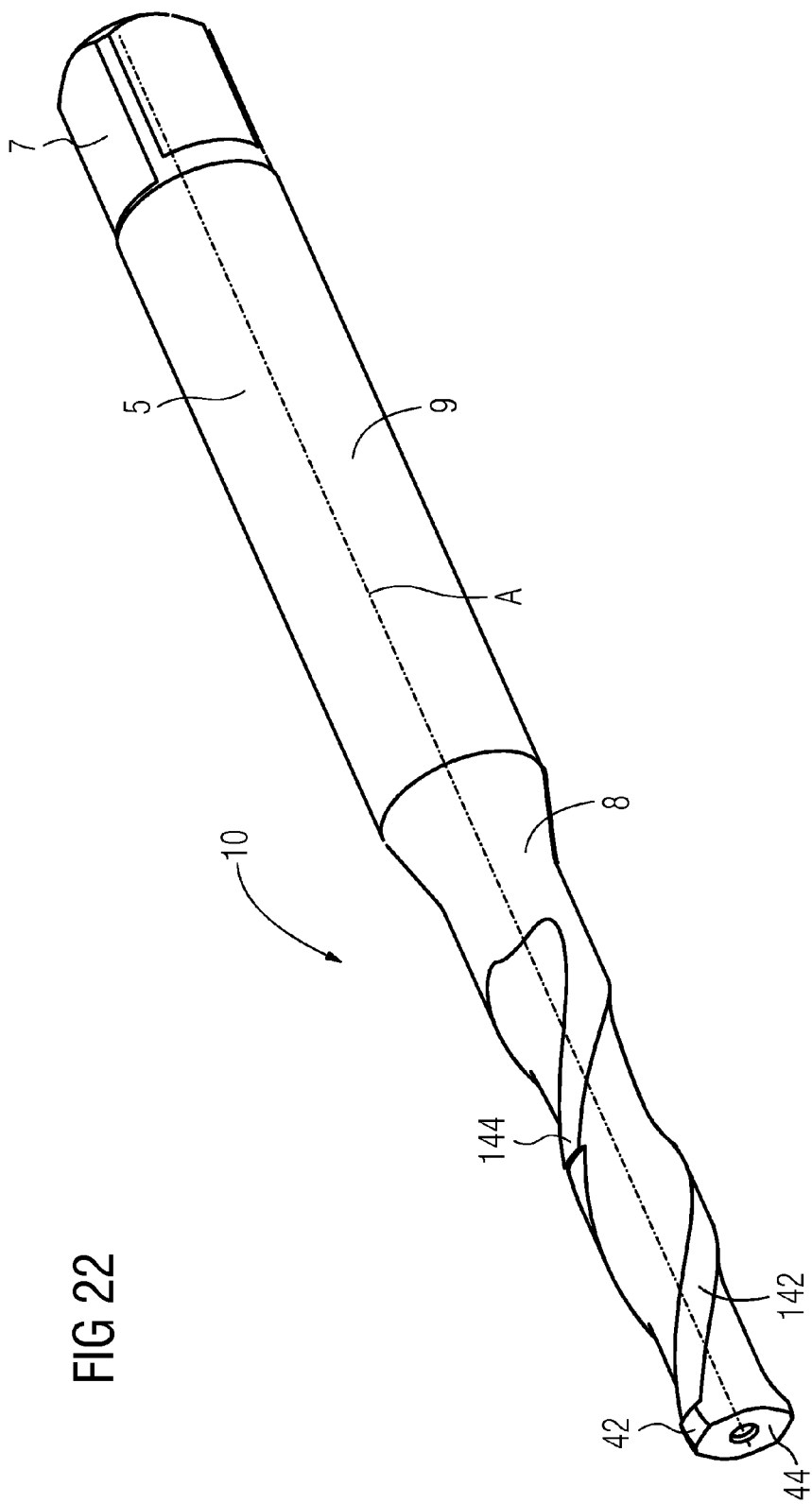
FIG. 22 shows a perspective view of a groove generating tool.

FIG. 22 shows an exemplary embodiment of a groove generating tool 10 having twisted groove generating regions 142 and 144, by means of which the twisted grooves 22 and 24 can be generated in the core hole 20 by a shaping and non-cutting process.

Alternatively, however, it is also possible to equally generate the core hole 20 with the grooves 22 and 24 as per FIG. 2 by means of one tool, for example a milling tool or in the case of thin workpieces such as metal sheets also by means of a punching tool moved with a twisting motion, or in one working step, and therefore the core hole 20 as per FIG. 1 is dispensed with.

The generation of a thread in the core hole 20 provided with the grooves 22 and 24 as per FIG. 2 will now be explained with reference to FIGS. 3 to 5.

Figure 3:
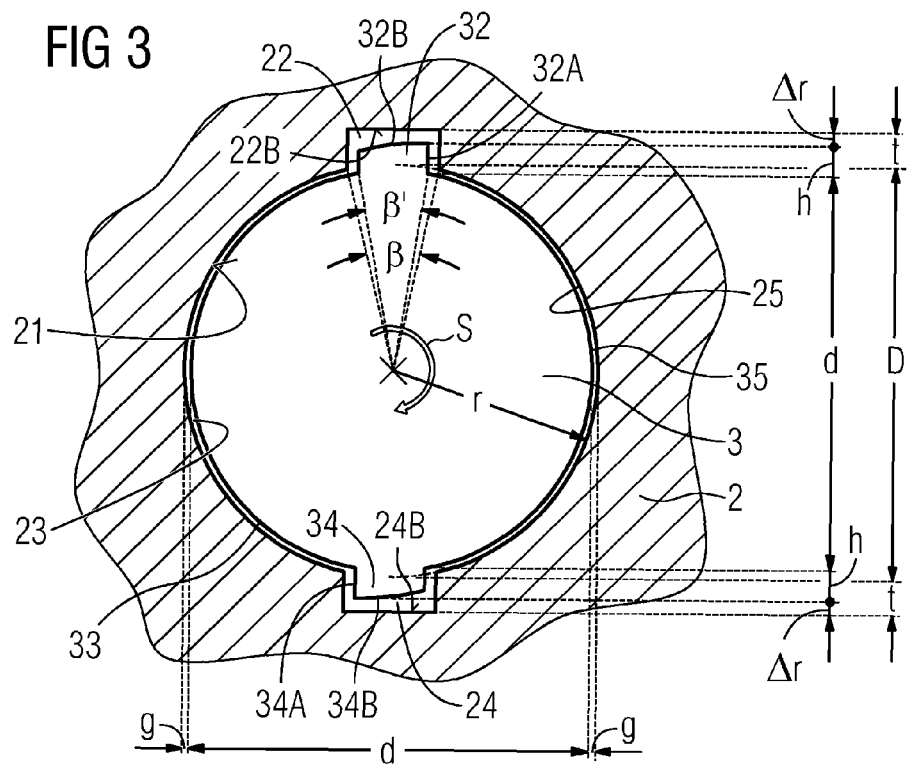
FIG. 3 shows a sectional illustration of the core hole as per FIG. 2 with a tool, having two thread generating regions situated in the grooves, inserted in a second method step.

According to FIG. 3, a tool 3 which is rotatable about its tool axis A is inserted, with its tool axis A coaxial with respect to the central axis M of the core hole 20, into the core hole 20. The tool 3 has two thread generating regions 32 and 34 arranged diametrically with respect to the tool axis A or offset with respect to one another by 180°, and has two, here in particular cylindrical, outer surfaces 33 and 35 between the thread generating regions 32 and 34.

During the insertion of the thread generating regions 32 and 34 into the grooves 22 and 24, the thread generating regions 32 and 34 follow the twisting or the helicity of the grooves 22 and 24, preferably by the control of movement through a correspondingly helical movement by the superposition of axial feed motion and rotational movement. The feed speed of this axial feed movement during the insertion of the tool 3 and the thread generating regions 32 and 34 thereof into the grooves 22 and 24 of the core hole 20 is adapted to the rotational speed of the rotational movement and the twist pitch or pitch of the helix of the grooves 22 and 24, in such a manner that, in the same amount of time as that which the tool 3 would take to perform one full revolution, the axial feed or the axial travel would correspond precisely to the twist or helix pitch. The axial feed speed of the tool 3 during insertion into the twisted grooves 22 and 24 thus corresponds to the product of the twist pitch of the grooves 22 and 24 and the rotary frequency of the tool 3.

It is also conceivable, however, to allow the grooves 22 and 24 to guide the thread generating regions 32 and 34 in the helical movement in the event of a purely axial feed motion and when the tool 3 is simultaneously permitted to rotate to a certain extent in a manner opposite to the twisting of the grooves 22 and 24.

The rotation of the tool 3 during the twisted or helical insertion movement into the twisted grooves 22 and 24 is adapted in terms of its direction of rotation to the twisting direction or the direction of rotation of the helix of the grooves 22 and 24, and can correspond to the direction of rotation S shown (for the thread generation) or also to the opposite direction of rotation.

The thread generating regions 32 and 34 project radially further outward than the outer surfaces 33 and 35. The diameter of the thread generating tool 3 from the outer surface 33 to the outer surface 35 is denoted by d.

The thread generating regions 32 and 34 have thread-cutting teeth 32A and 34A (of which in each case only one is visible in section in FIG. 3) arranged on a spiral or helical line or helix, which corresponds in terms of thread pitch to the thread to be generated, about the tool axis A, and said thread generating regions have outer free surfaces 32B and 34B which adjoin the thread-cutting teeth 32A and 34A. In FIG. 3, the thread-cutting teeth 32A and 34A are arranged at the front as viewed in a direction of rotation S about the tool axis A, and the free surfaces 32B and 34B run in each case rearward from the thread-cutting teeth 32A and 34A. The thread-cutting teeth 32A and 34A are the radially furthest outward projecting regions of the thread generating regions 32 and 34 of the thread generating tool 3. The radial height of the thread-cutting tooth 32A or 34A in relation to the rest of the outer circumference of the thread generating tool 3, that is to say in particular in relation to the outer surfaces 33 and 35 thereof, is denoted by h, and is preferably identical for both thread generating regions 32 and 34.

The radial spacing of the thread-cutting teeth 32A and 34A to the respective groove base 22B and 24B of the respective groove 22 or 24 is denoted by Δr, and is preferably likewise identical for both grooves 22 and 24. Said radial spacing Δr is typically chosen to be between ½₀ and ⅕ of the groove depth t.

The thread generating region 32 projects in a radial direction r into the groove 22, and the thread generating region 34 projects into the groove 24. The following thus applies for the respective dimensions: d<D and d/2+h<D/2+t.

The radial spacing or the gap width between the wall sub-region 23 of the core hole wall 21 and the facing outer surface 33 of the thread generating tool 3, and between the wall sub-region 25 of the core hole wall 21 and the facing outer surface 35 of the tool 3 is denoted by g and corresponds to g=(D−d)/2. Said gap width g and also the radial spacing Δr between the free surface 32B or 34B and groove base 22B or 24B respectively are illustrated in each case on an exaggerated scale in order to provide a clearer illustration. The clearance between the thread generating tool 3 on the one hand and the core hole wall 21 of the core hole 20 or the grooves 22 and 24 on the other hand will generally be smaller. It is preferably the case that 0.01<g/D<0.1, though other parameter relationships may also be selected.

The respective angle component (or extent in the circumferential direction or opening angle) β' of each thread generating region 32 and 34 is, as shown in FIG. 3, smaller than the angle component β of the associated groove 22 or 24, in order to allow for a clearance in the circumferential direction between the thread generating region 32 and 34 and the groove 22 and 24 and for the low-friction insertion of the thread generating regions 32 and 34 into the grooves 22 and 24, and to avoid damage to the tool or workpiece.

As a deviation from the illustration, the thread generating region can also be chosen to be narrower, i.e. with a smaller angle component β', and so too preferably the groove in a corresponding manner.

Figure 4:
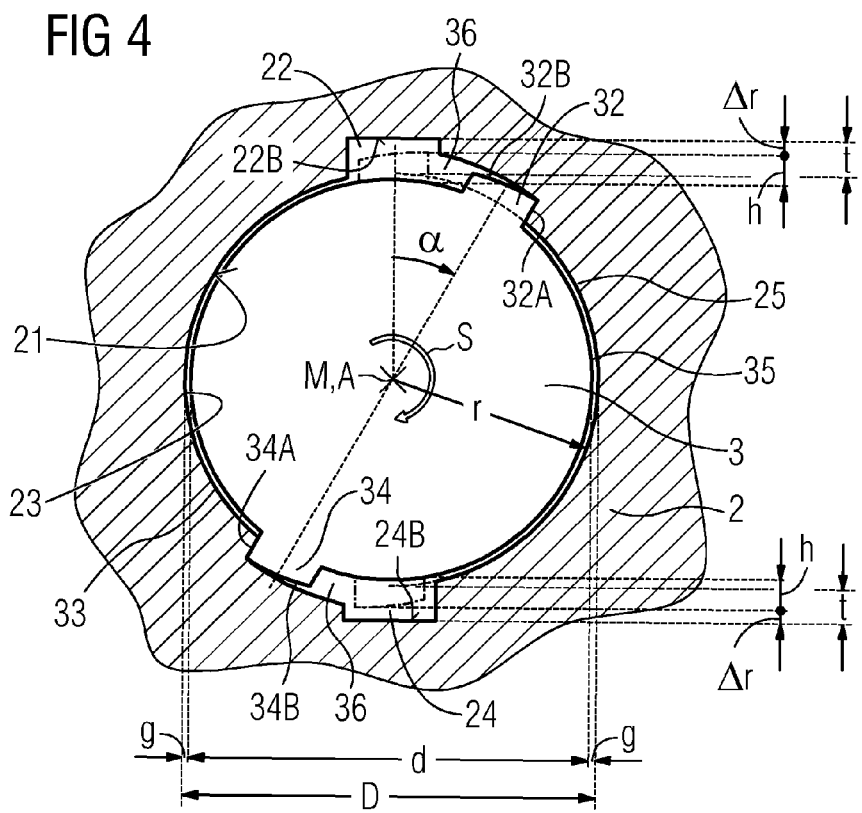
FIG. 4 shows a partially sectional illustration of the core hole as per FIG. 3 with the tool inserted therein, which tool, in a third method step, is rotated through an angle of rotation and moved with an axial feed motion, wherein the thread generating regions have generated a part of a thread flight.

FIG. 4 then shows the tool 3, which has been rotated during the thread generation in the direction of rotation S by an angle α in relation to the position shown in FIG. 3, in the core hole 20 of the workpiece 2.

In addition to the rotational movement in the direction of rotation S, during the thread generation the tool 3 is moved inward into the core hole 20 coaxially with respect to the tool axis A and also with respect to the central axis M by means of an axial or linear feed movement, which cannot be seen in the section in FIG. 4. The feed speed of this axial feed movement is adapted to the rotational speed of the rotational movement in the direction of rotation S and the desired thread pitch P and also the twisting of the grooves 22 and 24.

As a result of the rotational movement through the angle of rotation α of the thread generating tool 3, with simultaneous axial feed movement, a part of the thread flight 36 of the thread has been generated in the core hole wall 21 of the core hole 20, specifically proceeding from the groove 22 in the wall sub-region 25 and proceeding from the groove 24 in the wall sub-region 23. For illustration, the entire sub-region already generated in a turn of the generated thread flight 36 is also shown in the illustrated section in FIG. 4, even if strictly speaking this would be hidden in the section.

A plurality of thread-cutting teeth 32A and 34A arranged offset with respect to one another in a helical row corresponding to the twisting of the grooves 22 and 24 are preferably arranged in each thread generating region 32 and 34. Corresponding to the number of thread-cutting teeth 32A and 34A of each thread generating region 32 and 34, during half of one revolution, through $\alpha=180°$, of the thread generating tool 3 with a simultaneous feed movement by P/2, a number of thread turns of the thread flight 36 are generated corresponding to the number of thread-cutting teeth in the helical row, said thread turns being interrupted in each case by the grooves 22 and 24. Here, the thread-cutting teeth 32A and 34A, which are situated diametrically directly opposite one another, are arranged offset in each case by P/2 in order that the two separately generated half-turns of the thread flight 36 in the wall region 23 and in the wall region 25 then merge into one another, after the groove 22 and 24, along the desired thread profile on the helical line with the thread pitch P.

Here, the radial height h of the thread-cutting tooth 32A or 34A determines the spacing of the thread base 36B of the thread flight 36 from the core hole wall 21.

A functionally complete rotation of the tool 3 such that each thread-cutting tooth 32A and 34A lands in the next groove 24 or 22, respectively, proceeding from the groove 22 or 24, respectively, in this case covers the entire interposed wall sub-regions 23 and 25, such that the thread flight 36 is generated entirely therein.

Figure 5:
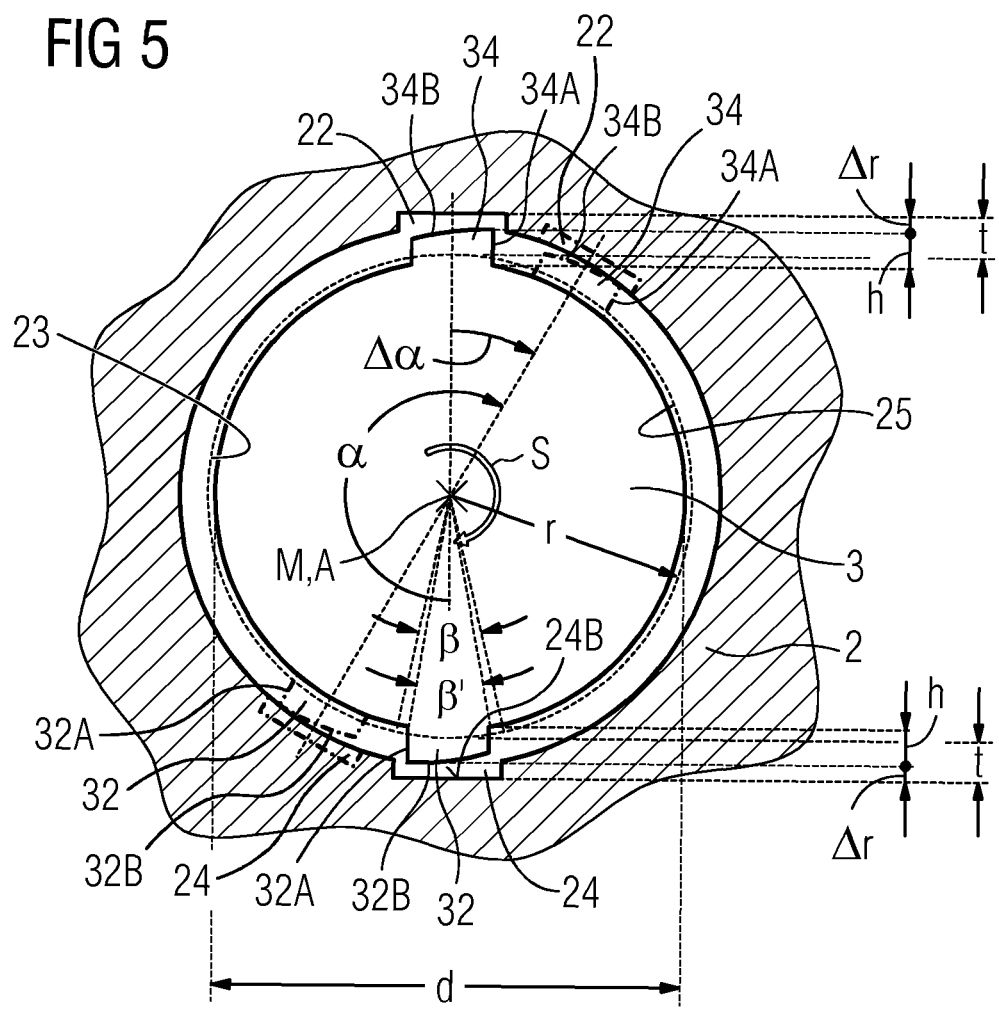
FIG. 5 shows a partially sectional illustration of the core hole as per FIGS. 3 and 4 with the tool inserted therein, which tool, in the third method step, has been rotated through the full angle of rotation and moved with an axial feed motion, wherein the thread generating regions have generated the complete thread flight.

The state after such a functionally complete rotation is shown in FIG. 5. The thread generating region 32, which previously projected into the groove 22, now projects into the diametrically opposite groove 24, and the thread generating region 34, which previously projected into the groove 24, now projects into the groove 22, in each case with the radial spacing $\Delta r$ to the groove base 24B and 22B respectively.

As a result, in a further step the thread generating tool 3 can then be removed from the core hole 20 again in a helical extraction movement about the central axis M corresponding to the twisting of the twisted grooves 22 and 24, since the thread generating regions 32 and 34 can be moved outward again in a helical or twisted extraction movement along the twisted grooves 24 and 22 without damage being caused to the thread flight 36 generated.

On account of the twisting of the grooves 22 and 24, the angle of rotation $\alpha$ for such a functionally complete rotation of the tool 3 between the two grooves 22 and 24 is thus not just 180°, as would be the case for straight axial grooves, but rather is to be corrected by an angle of rotation correction $\Delta\alpha$, which depends on the twist pitch of the grooves 22 and 24 on the one hand and on the thread pitch on the other hand.

Given commonly a number $n>=1$ of grooves and in the case of an equidistant or uniform distribution of the grooves in the core hole wall 21, i.e. a spacing angle of 360°/n, the angle of rotation $\alpha$ for a functionally complete rotation of the tool 3 between the two grooves 22 and 24 is $\alpha=360°/n+\Delta\alpha$ where $\Delta\alpha=360°/n\cdot P/(PN-P)$ or expressed differently $\alpha=360°/n(1+P/(PN-P))$ with the thread pitch P of the thread to be generated and the twist pitch PN of the grooves, i.e. the axial travel for a complete turn of the groove 22 or 24 about the central axis M, P and PN being chosen to be positive in the case of a right-handed thread or a right-handed twist and to be negative in the case of a left-handed thread or left-handed twist. The correction is thus determined according to the quotient P/(PN−P) from P and PN−P.

In the case of a non-equidistant arrangement or non-uniform distribution of the grooves, a complete rotation through at least 360° is generally necessary in order to bring the thread generating regions into the grooves again and to be able to pull the tool out, unless axial symmetry is present or n-fold rotational symmetry is present whereby each thread generating region projects into an associated groove again already with a smaller angle of rotation. The aforementioned angle of rotation correction $\Delta\alpha$ is also applicable in the non-equidistant case or in the case of non-uniform distribution.

The twisting direction or turning direction of the grooves is preferably the same as the twisting or turning direction of the thread, i.e. both are twisted around to the right or to the left, since then the direction of rotation of the tool does not have to be changed between groove generation and thread generation. It is also possible, however, to choose opposite twisting or turning directions, i.e. a right-hand twist for threads and a left-hand twist for grooves, or vice versa.

One advantage is that the tool 3, which is ultimately a modified tap, need not have a run-on cone or cut-starting region in which the maximum radial spacing of the thread-cutting teeth increases along a cone surface proceeding from the end of the tap in order to attain a corresponding growth of the chip and of the penetration depth of the thread-cutting teeth into the workpiece surface and in order to prevent the cut pressure from becoming too high.

In the case of the tool 3 according to the invention, which engages with its thread generating regions 32 and 34 into the previously generated grooves 22 and 24, the thread flight can moreover be generated uniformly with the full thread profile depth as per the radial height h of the thread-cutting teeth 32A and 34A, and, as viewed over the axial thread length of the thread, there is no loss, even in the case of a blind hole as a core hole 20, of a sub-region with an incomplete thread flight such as would otherwise be generated in the case of conventional taps by the cut-starter or run-on cone of the tap. The thread flight 36 which is generated also over a partial rotation is thus complete, specifically over its entire axial thread length. This is an advantage which can more than compensate for the certain strength disadvantage as a result of the interruptions of the thread flight 36 in the region of the two grooves 22 and 24.

Furthermore, despite the additional step of the generation of the grooves 22 and 24, the actual thread generating process can be performed in a shorter time than is possible with conventional taps in a circular core hole without grooves 22 and 24.

Compared to the straight grooves known from the prior art, the twisted grooves have the advantage that the axial forces required during groove generation are reduced. Owing to the twisting, a torque is superposed on the axial force, and this has a damping effect on the axial loading of a tool spindle. In the generation of grooves by cutting, the chips generated can be carried away more effectively forward into the twisted grooves.

Furthermore, it is advantageously possible for coolant and/or lubricant, in particular in the form of oil or oil aerosol, to be guided or conducted through the grooves 22 and 24 to the location of the thread generation, and said grooves can also be used for the discharge of chips. Furthermore, it is also possible for at least the last chips generated to be introduced by the thread-cutting tooth into the respective groove 22 or 24 and discharged there with a relatively large volume with the coolant and/or lubricant For the transport of coolant and/or lubricant to and from the thread generating regions 32 and 34 and/or for the discharge of chips from cutting thread generating regions 32 and 34, the thread generating tool 3 may also have outer grooves and/or inner ducts (not illustrated) which run on or to the thread generating regions 32 and 34.

The core hole 20 in FIGS. 1 to 5 may be either a through hole or a blind hole. The wall of the workpiece may thus, as illustrated, be the inner wall of a continuous or non-continuous hole in the workpiece for the production of an internal thread. The tool may however likewise be used for producing an external thread, wherein then, the grooves and subsequently the thread are generated in the outer wall of a shank or bolt or the like, and the thread generating regions of the thread generating tool are correspondingly arranged on an inner surface or directed inward and engage from the outside into the outer wall of the workpiece. The thread generating tool is then also of greater diameter than the wall of the workpiece, whereas in the case of an internal thread, said thread generating tool is of smaller diameter.

Figure 6:
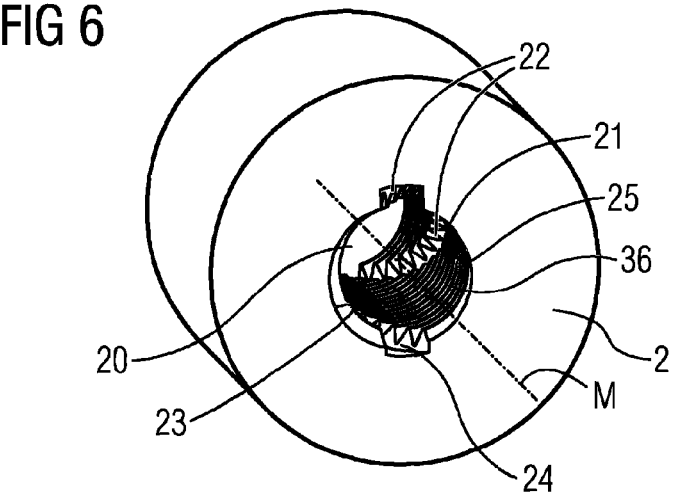
FIG. 6 shows a perspective illustration of a workpiece having a core hole with two twisted grooves and having a finished thread between the grooves.
Figure 7:
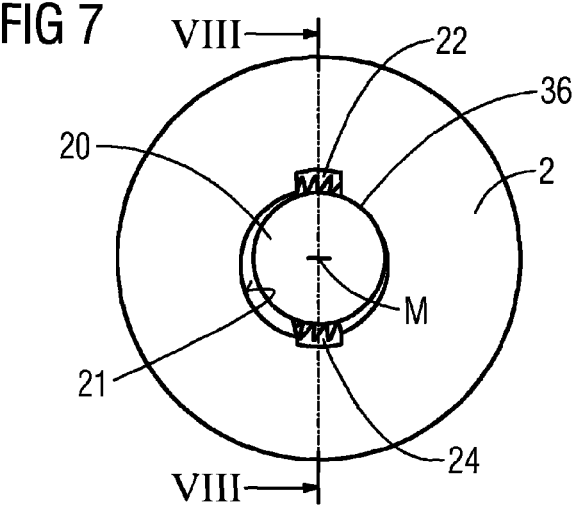
FIG. 7 shows a plan view of the core hole as per FIG. 6.
Figure 8:
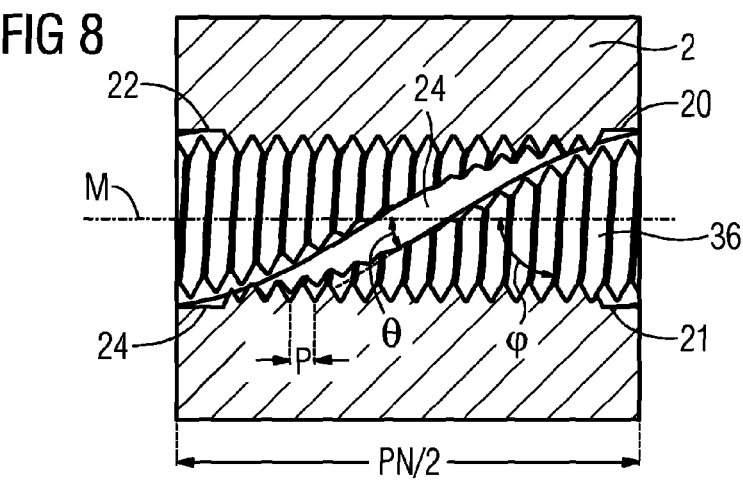
FIG. 8 shows a sectional illustration of the core hole as per FIG. 7 along the line VIII-VIII in FIG. 7.

FIGS. 6 to 8 show a thread, generated by means of the tool according to the invention, in a through hole as a core hole 20, with the thread generating tool 3 already having been pulled out.

The thread flight 36 has been fully generated in the wall sub-regions 23 and 25 of the core hole wall 21 of the core hole 20 and is interrupted only in the region of the grooves 22 and 24. The central axis M of the core hole 20 is then the thread axis of the generated thread with the (interrupted) thread flight 36.

FIG. 8 also shows the thread pitch P and the thread pitch angle $\phi$ (with respect to the cross-sectional plane perpendicular to the central axis M) of the thread flight 36 and also, for comparison, the groove twist pitch PN, of which half PN/2 is shown, and the groove twist angle $\theta$ (with respect to the cross-sectional plane perpendicular to the central axis M) of the twisted groove 24 visible in this respect.

The helix of the grooves is generally chosen to be significantly wider and steeper than the helix of the thread, in order to be able to attain and retain the time advantage in the process, which has already been described and is particularly great in the case of straight grooves as in the prior art, compared to conventional tapping or thread cold-forming even in the case of twisted grooves.

This means that the thread pitch P, which corresponds in particular to the spacing or the pitch of two thread teeth of thread generating regions 32 and 34 of the tool 3, is chosen to be considerably smaller than the groove twist pitch PN, which preferably corresponds to the pitch of the twisted thread generating regions 32 and 34 of the tool 3, generally PN>4 P, in particular PN>6 P, preferably PN>18 P, it also being possible for PN>36 P to be chosen, and/or the thread pitch angle $\phi$ of the thread flight 36, corresponding to the angle from one thread tooth lying on the thread line to the next thread tooth lying on the thread line, as measured in relation to the central axis M or tool axis A, is considerably greater than the groove twist angle $\theta$, which corresponds in particular to the twist angle of the twisted thread generating regions 32 and 34 of the tool 3 and is likewise measured in relation to the central axis M or tool axis A, in particular $\phi > 2\theta$, preferably $\phi > 4\theta$.

Preferred absolute values for the groove twist angle $\theta$ are generally between 2° and 70°, in particular between 5° and 45° and preferably between 7° and 25°.

Preferred absolute values for the thread pitch angle $\phi$ are generally between 80° and 89.5°, preferably between 85° and 89°.

In a further embodiment, as a thread generating tool, instead of a tap modified according to the invention such as is shown in FIGS. 3 to 5, there may also be provided a cold-forming tap modified according to the invention, in which the thread generating regions have radially outwardly projecting pressing lobes or cold-forming teeth instead of thread-cutting teeth. The pressing lobes or cold-forming teeth generate the thread flight in a non-cutting manner, by plastic impression into the core hole wall 21, during the rotational movement and simultaneous axial feed movement of the thread generating tool. The pressing lobes may in particular be arranged in the center of the thread generating regions, again with a radial spacing to the respective groove base of the grooves.

With regard to the working movements and geometry, the statements made above largely apply analogously if the thread-cutting tooth 32A and 32B is replaced with a thread shaping tooth or pressing lobes.

Figure 9:
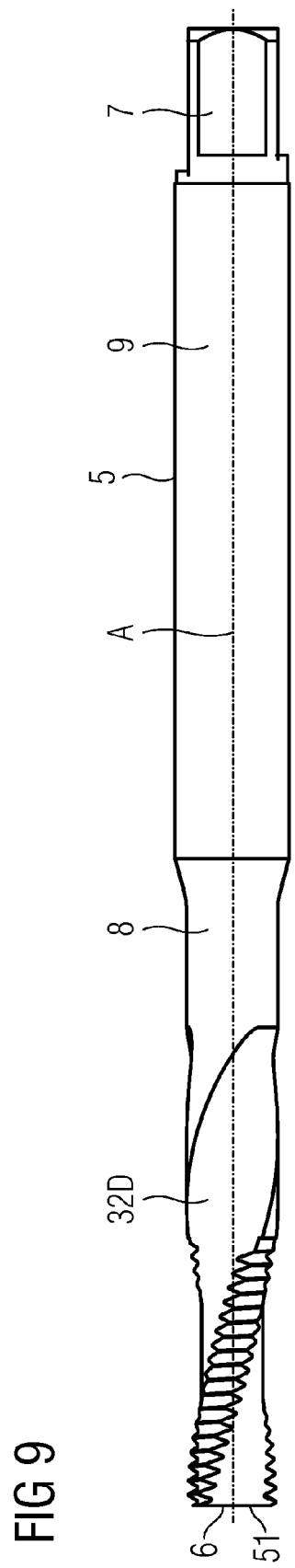
FIG. 9 shows a thread generating tool which operates in a non-cutting manner and which has two thread generating regions.
Figure 10:
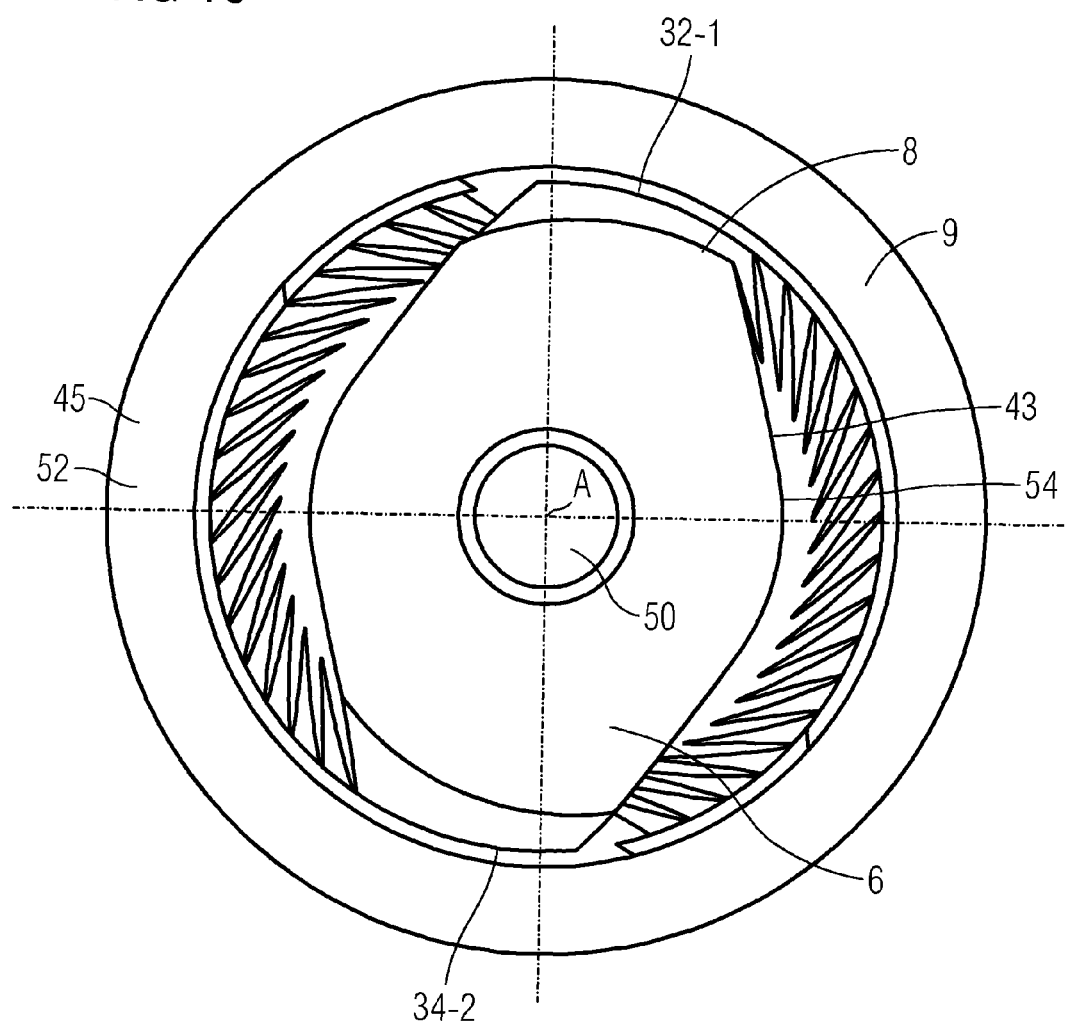
FIG. 10 shows an end view of a thread generating tool which operates in a non-cutting manner.
Figure 11:
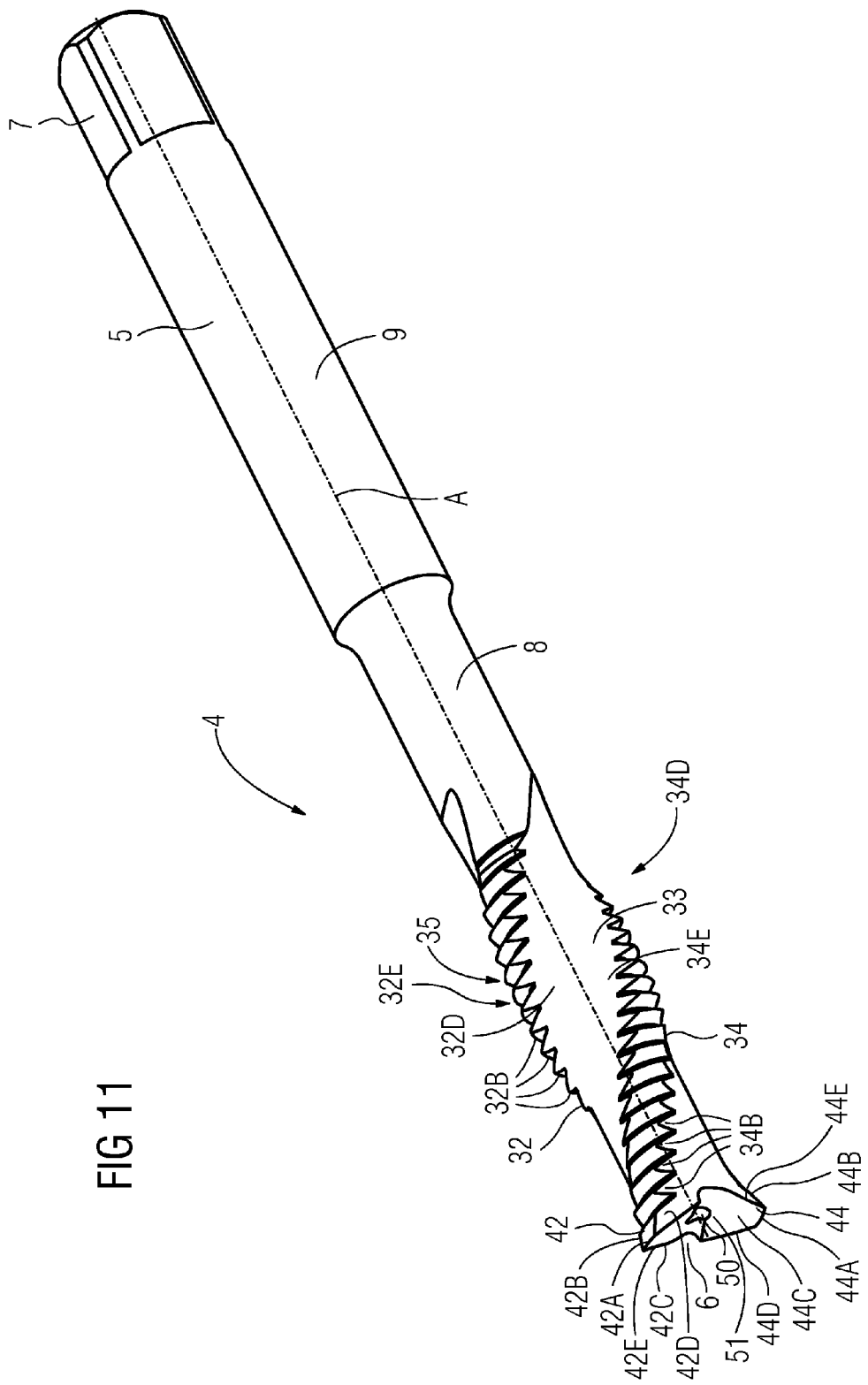
FIG. 11 shows a perspective view of a combined tool having two thread generating regions and, in front thereof, groove generating regions.
Figure 12:
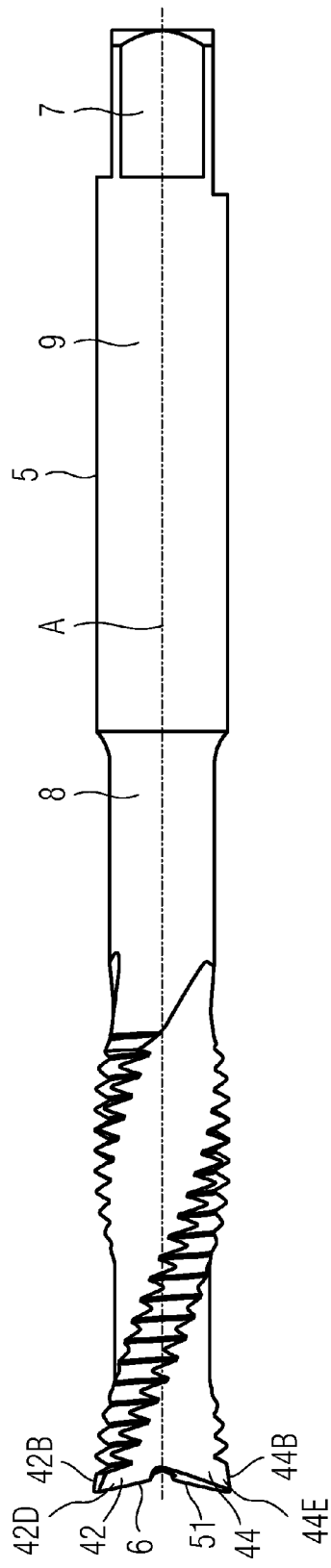
FIG. 12 shows a perspective side view of the tool as per FIG. 11.
Figure 16:
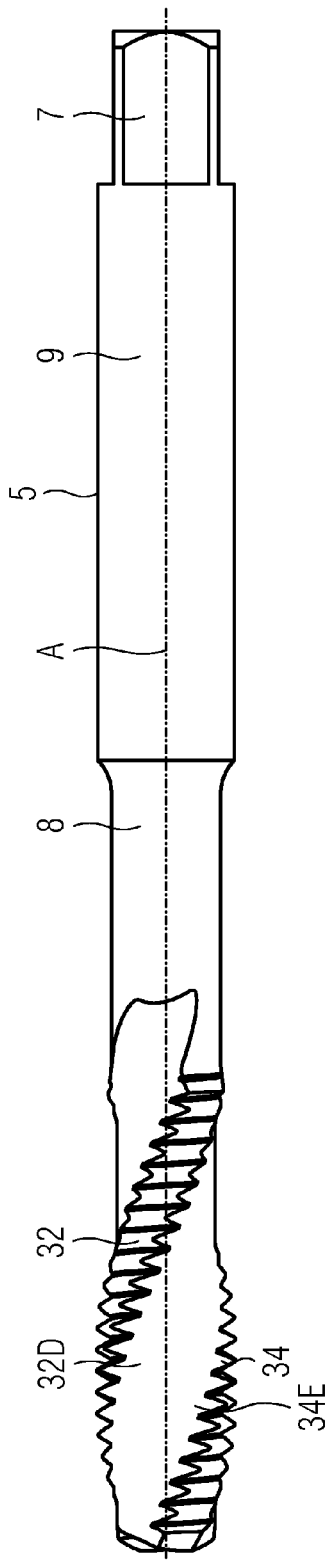
FIG. 16 shows a perspective side view of a further combined tool.
Figure 13:
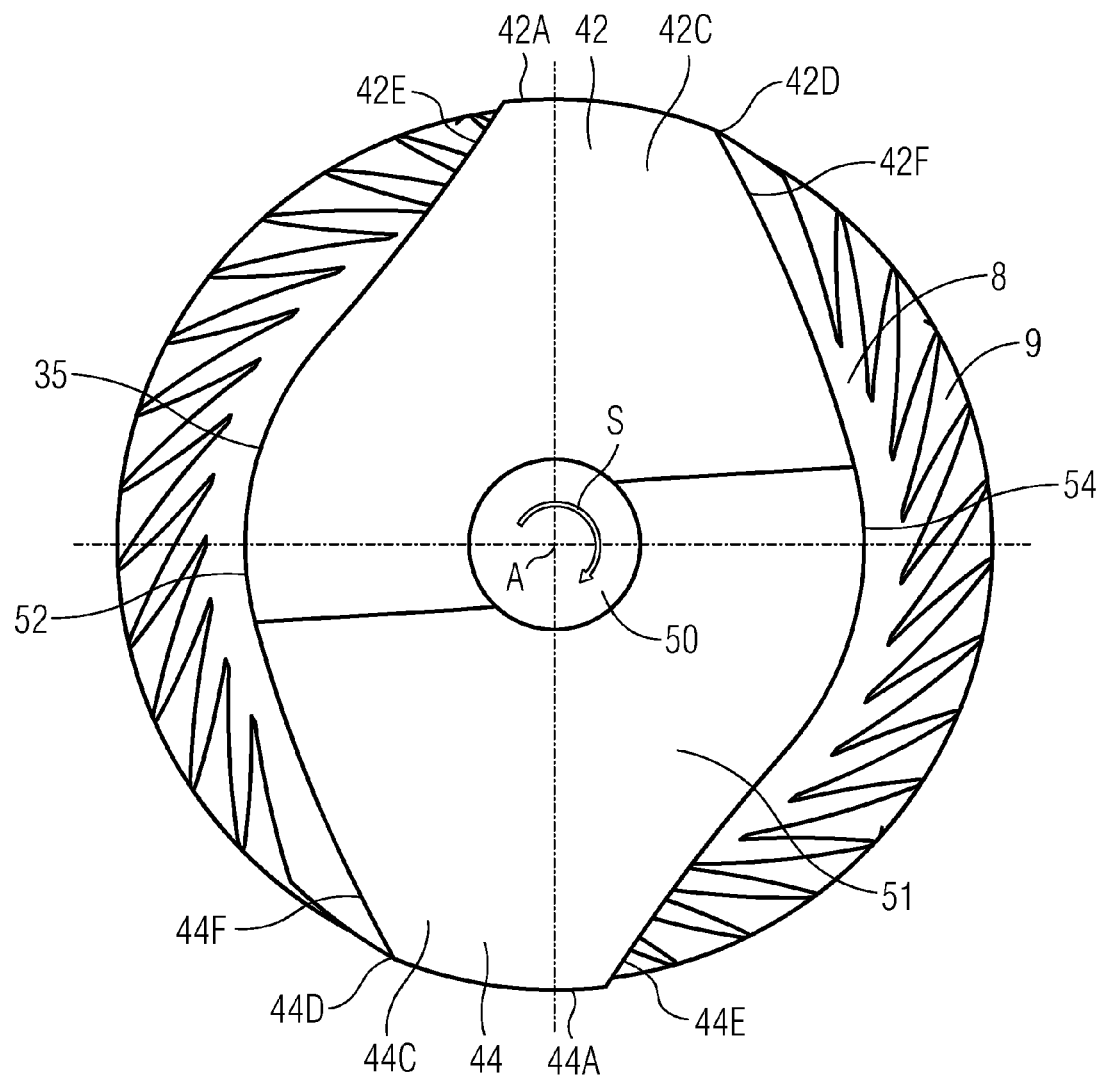
FIG. 13 shows an end view of the tool as per FIG. 12.
Figure 14:
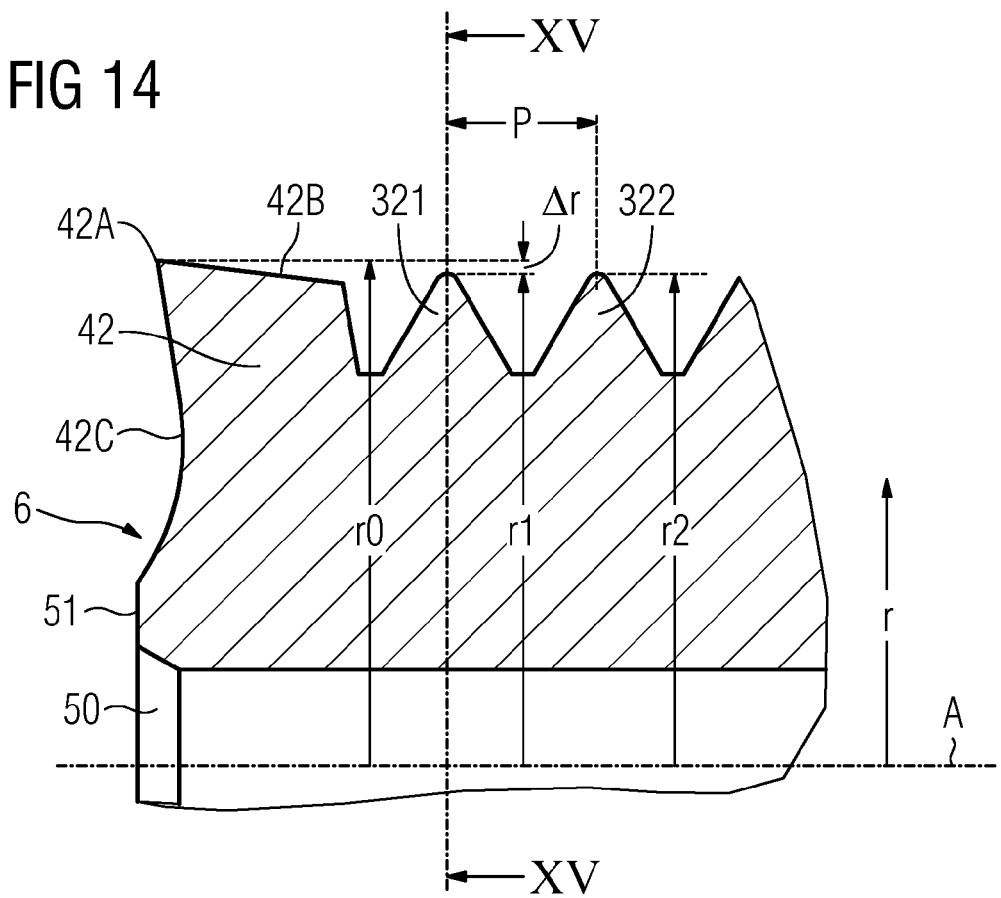
FIG. 14 shows a front part of the tool as per FIGS. 11 to 13 in a longitudinal section along XV-XV in FIG. 14.

FIGS. 9 and 10 show an exemplary embodiment of such a threading tool 3 according to the invention which is in the form of a non-cutting cold-forming tap, has no groove generating region and is used to generate a thread in a core hole 20 with twisted grooves 22 and 24 which have already been generated.

The threading tool 3 comprises a shank 5 which has a rear portion 9, which is for example of cylindrical form, and a front portion 8 which is narrowed in diameter adjacent to the rear portion 9 and centrally through which the tool axis A extends. At the end of the rear portion 9 there is formed a polygon 7 or a clamping region of some other form for the clamping of the shank 5 in a clamping means, in particular a chuck or clamping jaw, of a machine tool for driving the threading tool 3, in particular for rotating the latter about the tool axis A.

The front portion 8 has, toward the face side 6 which faces away from the rear portion 9 or which is arranged at the front (or: toward the free end), two thread generating regions 32 and 34, which are in the form of rows of thread generating ridges each running twisted about the tool axis A and are arranged diametrically in relation to one another on opposite sides of the tool axis A.

The thread generating ridges run along the thread pitch of the desired thread and are thus inclined by the thread pitch angle relative to a plane orthogonal with respect to the tool axis A, and have in each case one pressing lobe or shaping wedge, which projects radially furthest outward with respect to the tool axis A, for the plastic impression of the thread flight into the workpiece.

The pressing lobes of the first three thread generating ridges of the thread generating region 32 proceeding from the face side 6 are denoted in FIG. 9 by 32-1, 32-2 and 32-3, and those of the thread generating region 34 are denoted by 34-1, 34-2 and 34-3. In FIG. 10, only the foremost pressing lobes 32-1 and 34-1 are visible.

The radii or spacings of the thread generating ridges of the two thread generating regions 32 and 34 from the tool axis A are constant or equal to one another. In this way, even the radii of the shaping wedges or pressing lobes 32-1, 32-2 and 32-3 and 34-1, 34-2 and 34-3 situated furthest forward at the face side 6 are equal to one another. The cold-forming tap or the thread generating tool 3 both as per FIG. 9 and also as per FIG. 10 thus has no initial-forming cone and thus no increasing radius over the first thread shaping wedges. Rather, the radii of the pressing lobes of all of the thread generating ridges in each of the thread generating regions 32 and 34 are equal or constant over the entire axial length. The furthest outward projecting shaping wedges or pressing lobes, including the pressing lobes 32-1, 32-2 and 32-3 of the thread generating ridges, thus lie on a lobe axis B which runs parallel, or with constant radial spacing, to the tool axis A. The same applies to the thread generating ridges with the pressing lobes 34-1 to 34-4 of the thread generating region 34.

The two thread generating regions 32 and 34 are separated by interposed outer surfaces 33 and 35 which have a smaller radius from the tool axis A or a smaller outer diameter than the thread generating regions 32 and 34, that is to say are recessed radially with respect to said thread generating regions. The thread generating regions 32 and 34 are thus the radially furthest outward projecting parts in the front portion 8 of the thread generating tool 3, and the outer surfaces 33 and 35 form free spaces between the thread generating regions 32 and 34.

Each outer surface 33 and 35 of the thread generating tool 3 between the thread generating regions 32 and 34 thereof has a special shape and bulges convexly outward into bulges 52 and 54. Good rigidity is attained as a result of the convex bulges 52 and 54.

The diameters or radii of the thread generating ridges of the two thread generating regions 32 and 34 are constant, that is to say the outer radii of the outwardly projecting shaping wedges 32-1, 32-2 and 32-3 which are situated furthest forward at the face side 6 are in each case identical. The cold-forming tap or the thread generating tool 3 thus has no initial-forming cone or run-on region with an increasing outer radius over the first thread shaping wedges for the successive deepening or working-in of the thread flight at the thread base. Rather, the radii of all of the thread generating ridges and the shaping wedges thereof in each of the thread generating regions 32 and 34 are identical or constant over the entire axial length, as shown on the basis of the first three thread generating ridges 32-1, 32-2 and 32-3. The furthest outward projecting shaping wedges or pressing lobes of the thread generating ridges thus lie on a lobe axis B which runs parallel or with a uniform radial spacing to the tool axis A. The same applies to the thread generating ridges of the thread generating region 34 (not illustrated in FIG. 9). The special shape of the free spaces 52 and 54 and of the thread generating region 32 and 34 permits the use of the thread cold-forming tool 3 as per FIG. 9 or FIG. 10 for thread generation according to the invention or else as per FIGS. 1 to 8, wherein the thread generating regions 32 and 34 are inserted with twisting into the previously generated grooves 22 and 24 in the workpiece 2, and the thread generating tool 3 is then rotated in the described manner until the thread generating regions 32 and 34 come to rest again in the associated grooves or in the opposite grooves 22 and 24 or 24 and 22, whereafter the tool 3 can be pulled with twisting out of the workpiece 2 again.

FIGS. 11 to 15 show various illustrations of a combined tool 4 according to the invention, in which, in the front portion 8 of the tool 4, in addition to two cutting thread generating regions 32 and 34, a groove generating region 42 is also positioned with twisting in front of the thread generating region 32 on the face side 6 and a groove generating region 44 is positioned with twisting in front of the thread generating region 34.

Each groove generating region 42 and 44 has a groove cutting edge 42A or 44A which is directed axially forward and situated on the face side 6. The groove cutting edges 42A and 44A are the radially furthest outward projecting regions, and the axially furthest forward situated regions of those regions which are situated radially at the outside, of the tool 3 in the front portion 8 thereof.

Figure 15:
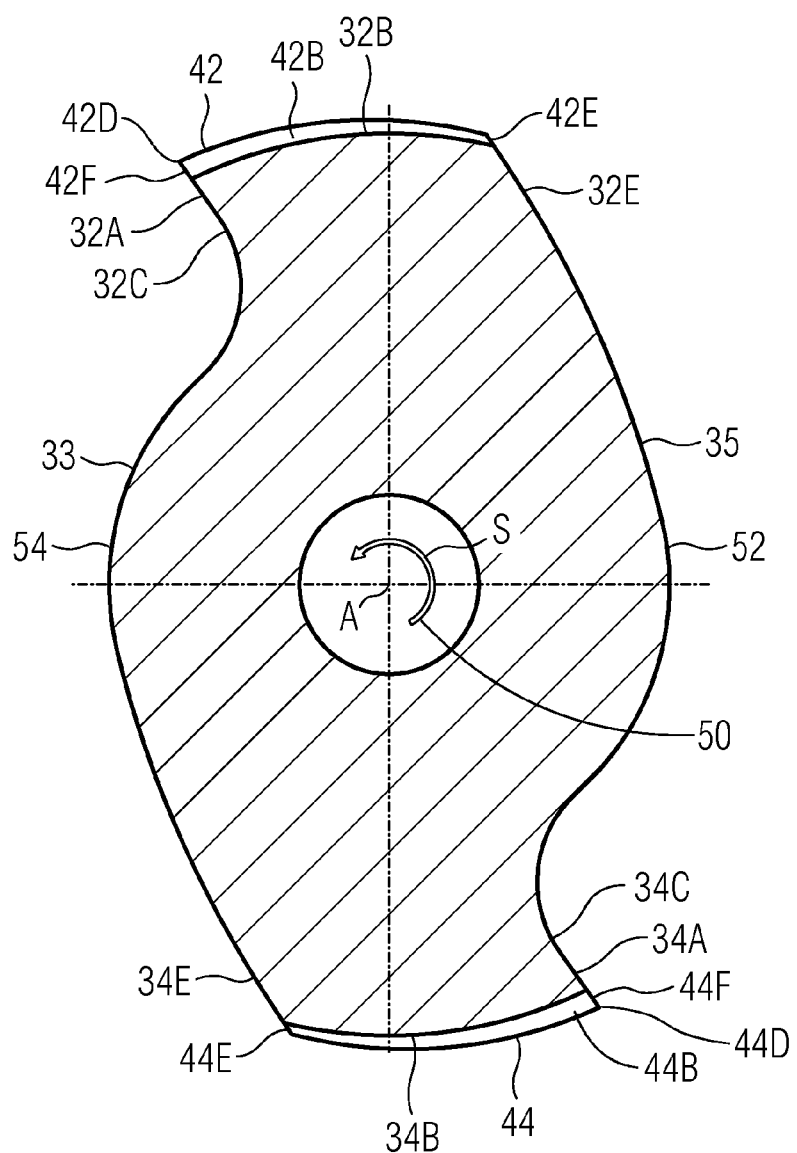
FIG. 15 shows a front region of the thread generating tool as per FIGS. 11 to 14 in a section, inclined obliquely along the thread pitch, through the front thread teeth in a view toward the front along the line XV-XV in FIG. 14.

The groove cutting edges 42A and 44A may in particular be of at least approximately circular form. As shown in FIG. 15, the radius r0 of the groove cutting edge 42A is greater by a differential radius Δr than the radius r1 of the first thread generating sub-region 321 and than the radius r2, which in FIG. 15 is identical to radius r1, of the second thread generating sub-region 321.

Each groove cutting edge 42A and 44A is adjoined laterally in a circumferential direction by a side cutting edge 42D and 44D, which is at the front in the direction of rotation S about the tool axis A, and by a side region 42E or 44E which is at the rear in the direction of rotation S about the tool axis A.

During the rotation of the tool 4 in the direction of rotation S which takes place for the generation of the thread, the front side cutting edge 42D and 44D cuts laterally into the workpiece, and said front side cutting edge is correspondingly ground so as to be adjoined in a radially inward direction by a rake surface 42F or 44F for the discharge of chips. The rear side region 42E and 44E is, by contrast, at an obtuse angle and is preferably of convex form, since it merely follows but need not perform any cutting.

Axially behind the groove cutting edge 42A and 44A there adjoins a free surface 42B and 44B which, as shown in FIG. 15, slopes downward, in particular in a linear or conical fashion, from the radius r0 to a radius smaller than the radius r1 of the first pressing lobe 32-1.

The groove cutting edge 42A is adjoined in a radially inward direction by a face-side rake surface 42C, and the groove cutting edge 44A is correspondingly adjoined in a radially inward direction by a rake surface 44C, which rake surface in each case runs axially rearward in a linear or else concavely curved fashion and on which chips produced during the reaming of the groove with the groove cutting edge 42A or 44A are discharged. The rake surface 42C or 44C runs from a lowest point axially forward again to a planar central region 51 oriented perpendicular to the tool axis A, which central region surrounds a central opening of a central duct 50 of the tool 4, via which central duct coolant and/or lubricant can be supplied.

The two thread generating regions 32 and 34 in the combination tool 4 according to FIGS. 11 to 15 are preferably designed to impart a cutting action and have a plurality of thread-cutting teeth 32A and 34A arranged at the front in the direction of rotation S about the tool axis A, the outer cutting edges of which thread-cutting teeth are matched to the shape of the thread profile to be generated. A radially inwardly running rake surface for the chips generated by the thread-cutting teeth 32A and 34A is denoted by 32C and 34C respectively. On the outside, the thread-cutting teeth 32A and 34A are adjoined, oppositely to the direction of rotation S, by an outer free surface 32B or 34B which ends at a side region 32E or 34E which is at the rear in the direction of rotation S and which is slightly bulged convexly outward.

As viewed proceeding from the face side 6, the first three thread generating sub-regions of the thread generating region 32 with in each case one thread-cutting tooth are denoted by 32-1 to 32-3 in FIG. 15.

The thread-cutting teeth 32A and 34A are the radially furthest outward projecting regions of the thread generating regions 32 and 34. The groove generating regions 42 and 44 project radially still further outward than the thread generating regions 32 and 34, as can readily be seen in FIG. 15.

The two thread generating regions 32 and 34 are separated from one another by interposed outer surfaces 33 and 35 of the tool 4, and the groove generating regions 42 and 44, which are situated in front of said thread generating regions, are separated from one another by interposed outer surfaces 43 and 45 of the tool 4. The outer surfaces 33 and 35 and also 43 and 45 have a smaller radius from the tool axis A or a smaller outer diameter than the thread generating regions 32 and 34 and the groove generating regions 42 and 44, and form free spaces between the cutting thread generating regions 32 and 34 and the groove generating regions 42 and 44, which free spaces also serve for the discharge of chips.

It is preferable, in particular for reasons of simple production, for the shape and contour of the lateral regions, which are at the front and at the rear in the direction of rotation S, of the thread generating regions 32 and 34 and of the groove generating regions 42 and 44 and of the outer surfaces 33 and 35 and also 43 and 45 to be adapted to one another, in particular situated one above the other or congruent in the perpendicular projection along the tool axis A, that is to say for example the rake surfaces 32C and 42F and the side regions 32E and 42E and the outer surfaces 33 and 43 and also 35 and 45 are adapted to one another, in particular are ground together.

Each outer surface 33 and 43 and also 35 and 45 of the combined tool 3 initially forms concavely inwardly running portions directly adjoining the cutting edges, that is to say the groove cutting edges 42D and 44D and the thread-cutting teeth 32A and 34A, which portions form the rake surfaces 32C and 34C and 42F and 44F respectively and then bulge convexly outward into bulges 52 and 54, before then running outward on the other side into the convex side regions 32E and 34E and also 42E and 44E. As a result of the convex bulges 52 and 54, good rigidity and stability of the tool with respect to torques is achieved.

During the axial feed movement of the tool 4 and the axial reaming or cutting process, the contours of the groove cutting edges 42D and 44D are reflected in the groove contour of the groove 22 and 24 respectively. The thread-cutting teeth 32A and 34A generate the thread flight 36 during the subsequent rotational movement.

In the embodiment illustrated in FIGS. 11 to 15, the groove cutting edges 42A and 44A lie in a common plane which is oriented perpendicular to the tool axis A, that is to say are situated axially at the same height. In this way, the back sides of the cutting edges or free surfaces 42B and 44B, situated behind said groove cutting edges, of the groove generating regions 42 and 44 are of different lengths corresponding to the thread pitch. In an embodiment which is not illustrated, the groove cutting edges 42A and 44A may however also be arranged axially offset with respect to one another by the thread pitch in order to permit an equal axial length of the groove generating regions 42 and 44.

According to the invention, the thread generating regions work the thread in merely by means of a small rotation between one groove (for example 22 or 24) and the next groove (for example 24 or 22), wherein individual thread flight portions are generated which form parts of the helix of the thread and which are interrupted or separated from one another by the grooves. Each thread generating region and each thread-cutting tooth or thread shaping tooth or wedge therein thus generates an associated individually generated thread flight portion which, during a rotation only to the next groove, is passed through and generated only once and only by said thread generating region and its thread-cutting tooth or thread shaping wedge. During a rotation of each thread generating region to the next but one groove, the thread flight portion between two grooves is generally run through and worked in jointly in succession only by two successive thread generating regions and their thread-cutting teeth or thread shaping wedges. Considered conversely, each thread generating region and each thread-cutting tooth or thread shaping tooth or wedge therein machines the workpiece surface in two successive individual thread flight portions, one between the first groove with i=1 where $1 \leq i \leq n$ and the next groove with i=2 and one between the next groove (i=2) and the next but one groove (i=3 or i=1 again if n=2). In the general case of m further revolutions up to the m-th successive groove, where m is a whole number, m thread-cutting teeth or thread shaping wedges situated one behind another work in the same thread flight portion. Although, in extremely rare situations, m is selected to be greater than 2 or at most 3, m=1 will always suffice.

The outer profile of only one thread-cutting tooth or thread shaping wedge (or at most m thread-cutting teeth or thread shaping wedges) thus already defines the final thread profile of the thread flight portion generated by said tooth or wedge.

It is thus possible according to the invention for the thread to be composed of individual thread flight portions with practically arbitrarily predefined thread profiles, wherein the thread profile of each thread flight portion is, on its own and independently of the other thread flight portions, reflected by or formed so as to be complementary to the outer profile of the thread-cutting tooth or thread shaping wedge assigned during the rotation to the thread flight portion.

In the case of the known taps or cold-forming taps, said individual assignment of tooth to thread flight portion is not possible. Moreover, in the case of said tools according to the prior art, the axially foremost thread-cutting tooth or thread shaping tooth situated axially at the front closest to the face side is, during the rotational movement, guided through the entire thread flight over the entire thread length, and in the process generates a pilot thread flight, corresponding already in terms of length to the final thread, with a pilot thread profile. Said pilot thread flight and its pilot thread profile is then further worked in or reworked, in particular at the thread base and/or at the thread flanks of the thread profile, by the subsequent thread-cutting teeth or thread shaping teeth. For example, the next, second-to-foremost thread-cutting tooth or thread shaping tooth runs through the pilot thread flight generated by the foremost thread-cutting tooth or thread shaping tooth, likewise over at least a length corresponding to the overall length of the pilot thread minus the distance between the foremost thread-cutting tooth or thread shaping tooth and the second-to-foremost thread-cutting tooth or thread shaping tooth. The thread profile of the thread flight with thread flanks is thus worked successively into the workpiece by thread-cutting teeth or thread shaping teeth which are arranged along the thread helix and which successively perform work on the same points on the workpiece. This working sequence is particularly pronounced in the run-on region of said known threading tools.

The invention thus permits an axial division of the thread over its thread length, which has hitherto not been possible in the case of a tap or cold-forming tap, into different thread portions in which, in principle, any desired thread profiles may be generated in any desired sequence or combination. Here, it is even possible to generate threads in which first thread flight portions which are situated in front of second thread flight portions in the forward direction of the tool, or in a direction into the thread, have a thread profile with smaller dimensions or outer dimensions, in particular at the thread base but if appropriate also at the thread flanks, than the second thread flight portions, which would be technically impossible in the case of a known tap or cold-forming tap.

In a further embodiment of a thread generating tool which is not shown, taking a thread generating tool 4 as per FIG. 9 as a starting point, the thread generating region 32 behind the groove generating region 42 and the thread generating region 34 behind the groove generating region 44 can be divided in each case into two thread generating sub-regions arranged offset with respect to one another in the twisting direction. In the front thread generating sub-region arranged toward the face side 6 and directly adjacent to the associated groove generating region 42 or 44, it is now the case, by contrast to FIG. 9, that the thread-cutting teeth 32A and 34A are provided, in their thread cutting profile or outer profile, with in each case one flattening in the tooth tip region, which flattening is reflected in the thread base in the complementarily generated thread flight in the workpiece. By contrast, in the rear thread generating sub-region facing away from the face side 6 and situated behind the front thread generating sub-region, the thread-cutting teeth 32A or 34A are provided with a thread cutting profile or outer profile which corresponds to the complete thread profile of the generated thread, and for example have a tooth tip which is more pointed or merges into an outer edge or a spine, which tooth tip is reflected in a correspondingly formed thread base of the thread flight in the workpiece.

Each thread flight portion thus generated then has a thread profile which corresponds exactly to the outer profile of the associated thread-cutting tooth 32A or 34A, e.g. a trapezoidal interference-fit thread, in which the outer flattenings of the thread-cutting teeth are reflected in a correspondingly flattened or less deep thread base of the thread flight portions and a complete thread profile of a metric thread in other thread flight portions. All thread flight portions having different thread profiles generated in this way lie on a common thread helix with the thread pitch P.

In one exemplary embodiment, the diameter of the front thread sub-region is smaller than the diameter of the rear thread sub-region. In this way, a clamping action for a screw or a threaded bolt can be attained in the front thread sub-region, whereas no such clamping action arises in the rear thread sub-region which is formed as a full thread. By contrast to the illustrated exemplary embodiment, it is possible for a thread with some other, practically arbitrary axial distribution of its thread profile to be generated. For example, it would also be possible for the thread profiles in the front thread sub-region and in the rear thread sub-region to simply be reversed, such that the clamping action arises in the rear thread sub-region.

Instead of or in addition to cutting thread generating regions 32 and 34 with thread-cutting teeth 32A and 34A, provision may also be made, in all embodiments, of thread generating regions 32 and 34 which impart a shaping action or which press into the workpiece so as to cause plastic deformation of the latter and which have thread pressing lobes, for example as shown in FIG. 9 or FIG. 10.

Furthermore, it is also possible for more than two, for example three or four, thread generating regions, in each case with a groove generating region situated in front thereof in the case of the combination tool, to be provided, which thread generating regions may be arranged in a uniformly distributed manner, that is to say at uniform angular intervals, or else with a non-uniform distribution.

In a further embodiment which is not illustrated, it is also possible, as in the case of a known cold-forming tap or tap, for the thread pressing lobes or the thread-cutting teeth in a run-on cone region to grow in terms of their radial outer dimension up to the maximum outer dimension corresponding to the final thread depth, in order to generate the depth of the thread flight in successive passes during multiple rotations of the tool. This embodiment is suitable in particular for relatively large thread lengths, and reduces the torque acting on the tool during the thread generation process.

Finally, instead of or in addition to cutting or chip-removing groove generating regions of the tool, it is also possible for groove generating regions to be provided which operate in a non-cutting manner and which work the grooves into the material in particular by plastic deformation or impression.

Figure 20:
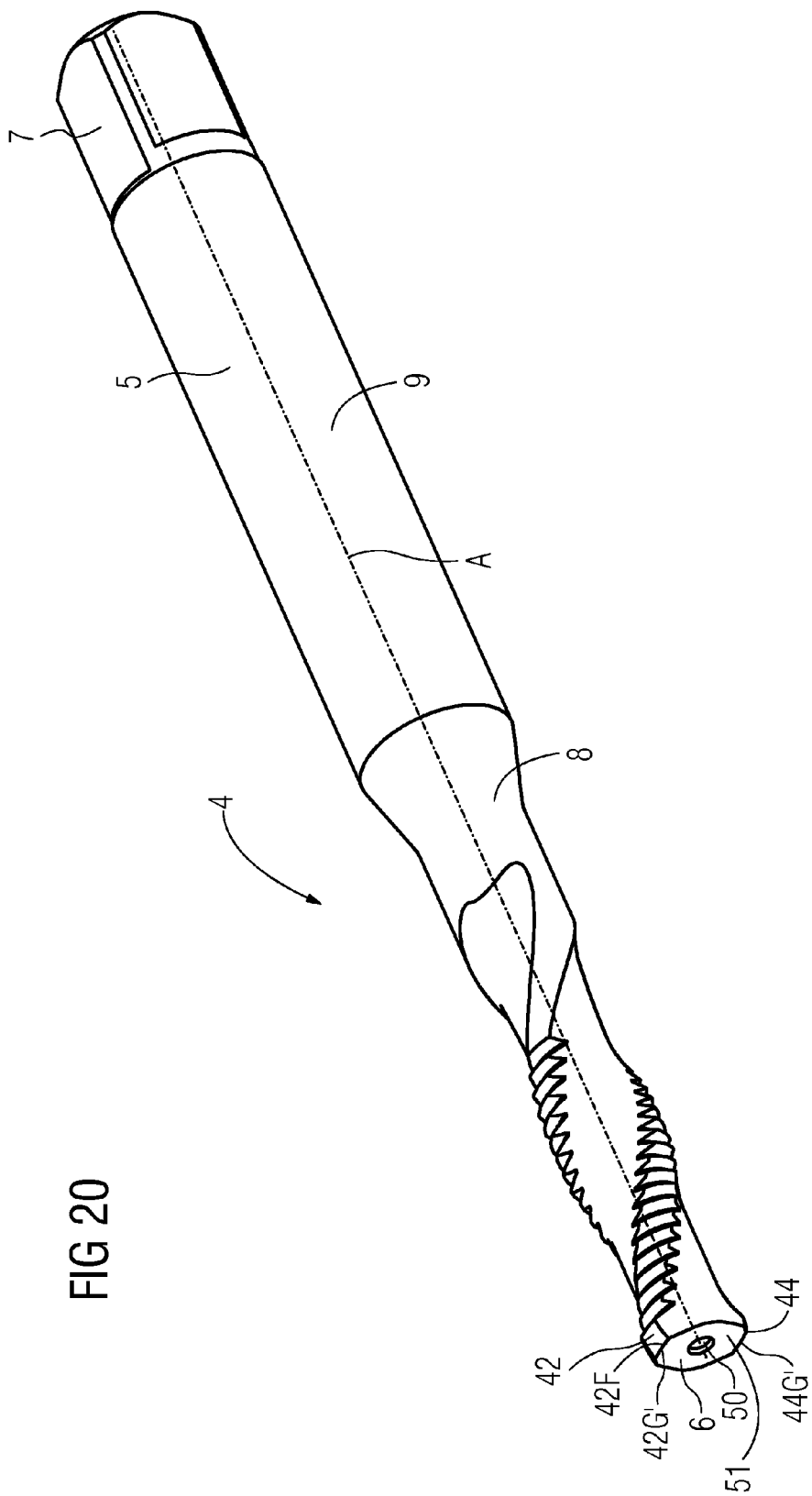
FIG. 20 shows a perspective view of a further embodiment of a combined tool having two thread generating regions and, in front thereof, non-cutting groove generating regions.
Figure 21:
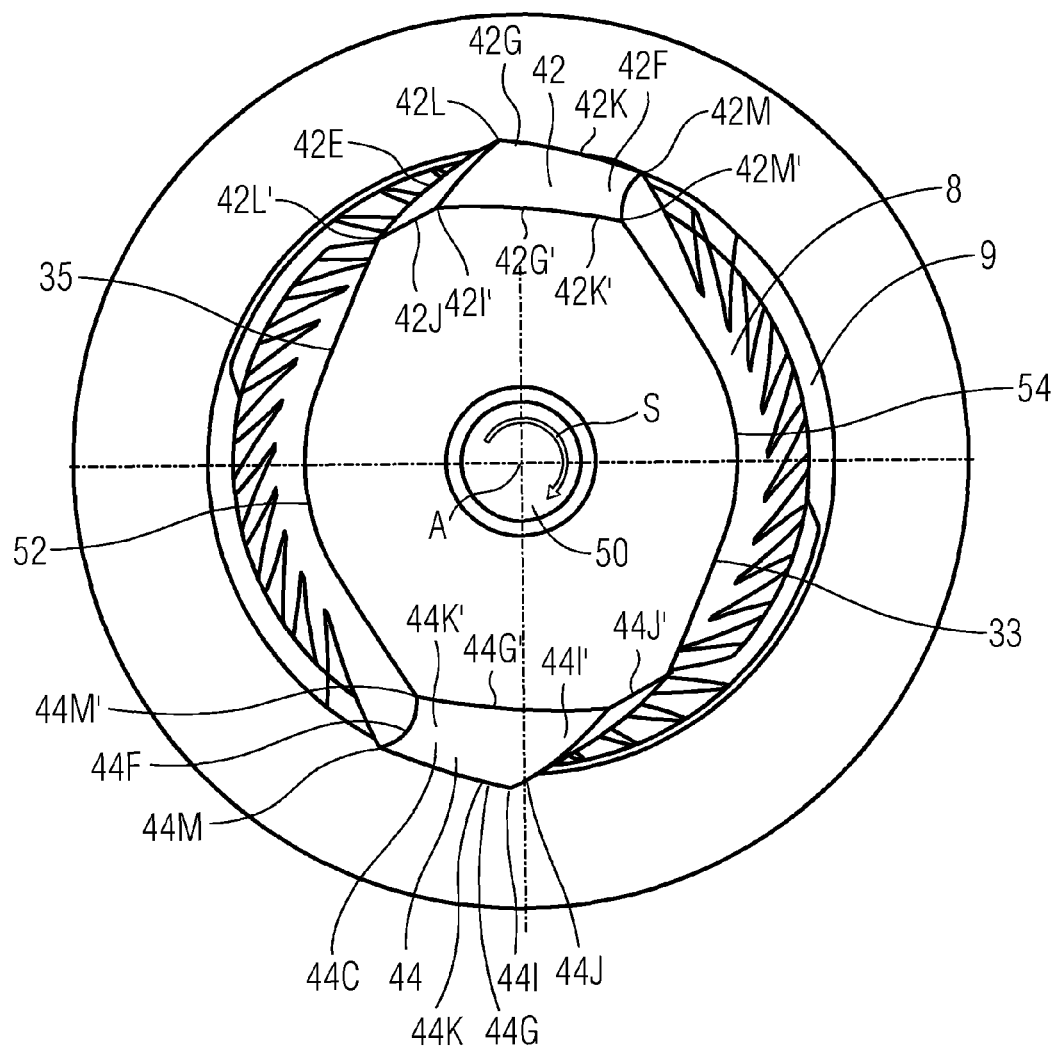
FIG. 21 shows an end view of the tool as per FIG. 20.

One exemplary embodiment for a combined tool 4 with such groove generating regions 42 and 44 which operate in a non-cutting manner is illustrated in FIGS. 20 and 21.

Each groove generating region 42 and 44 has a central shaping spine (or: shaping ridge, pressing ridge) 42G and 44G which runs substantially in a circumferential direction around the tool axis A and which, as viewed axially with respect to the tool axis A, is the radially highest elevation of the groove generating region 42 and 44, that is to say has the greatest radial spacing to the tool axis A or projects furthest outward.

Axially in front of the shaping spine 42G or 44G, each groove generating region 42 and 44 has a front surface 42F and 44F which rises axially to the shaping spine 42G or 44G from a front profile 42G' or 44G', situated radially further inward than the shaping spine 42G and 44G, on the face side 6 of the tool 4 and which forms a run-on surface by means of which the groove generating region 42 and 44 presses into the workpiece surface for the first time and with slowly increasing deformation force.

Behind the shaping spine 42G or 44G there adjoins, in an axial direction, a back surface 42H or 44H of the groove generating region 42 and 44, which back surface slopes downward from the shaping spine 42G or 44G in an axial direction.

The shaping spine 42G or 44G itself has, as viewed in a circumferential direction, an elevation which projects radially furthest outward, specifically a maximum 42I or 44I, and said shaping spine slopes downward radially from the maximum 42I or 44I in both circumferential directions, specifically in one flank 42J or 44J to a rear end point 42L or 44L which is situated radially further inward than the maximum 42I or 44I, and in a further flank 42K or 44K to a front end point 42M or 44M which is situated radially further inward than the maximum 42I or 44I. In the example shown in FIG. 24, the end point 42M or 44M is situated radially further inward than the end point 42L or 44L and the flank 42J or 44J is shorter than the flank 42K or 44K, and therefore the maximum 42I or 44I is situated closer to the rear side region 42E or 44E and rear end point 42L or 44L of the groove generating region 42 and 44. This asymmetric shape of the groove generating regions 42 and 44 leads to greater rigidity of the tool during the shaping of the grooves and/or is adapted to the following thread generating regions 32 and 34. A symmetric shape is however also possible.

The front profile 42G' or 44G' has a similar shape to the shaping spine 42G or 44G with a maximum 42I' or 44I' and two flanks 42J' or 44J', or 42K' or 44K', respectively, sloping downward from the maximum to end points 42L' or 44L', or 42M' or 44M', respectively. The front surface 42F or 44F connects corresponding maxima 42I and 42I' and also 44I and 44I', and corresponding end points 42L and 42L' and also 44L and 44L', and self-evidently the interposed flanks 42J and 42J' and also 44J and 44J' and 42K and 42K' and 44K and 44K'.

In the exemplary embodiment of FIGS. 22 to 24, the front surface 42F or 44F runs between the front profile and the shaping spine in an axial direction in a substantially linear manner, or by contrast in a convexly inwardly curved manner in the exemplary embodiment of FIG. 25. These and numerous other different shapes of the front surface 42F or 44F are possible depending on the desired growth or axial gradients of the deformation force.

The wedge-like shape, sloping downward in both circumferential directions, of the shaping spine 42G or 44G and of the front surface 42F or 44F permits a flow of the workpiece material also to the side or in a circumferential direction when the groove generating region 42 or 44 is moved axially into the workpiece.

In these exemplary embodiments as per FIGS. 20 to 21, the thread generating regions 32 and 34 of the tool 4 can have a cutting or else non-cutting action.

Preferred materials for the workpiece are metals, in particular aluminum alloys and magnesium alloys and other light metals, though the invention is not restricted to these materials. Furthermore, as workpieces, use may be made of both thick-walled or solid workpieces and also thin-walled components or metal sheets, composed in particular of steel or other materials.

LIST OF REFERENCE SIGNS

2 Workpiece
3 Tool
4 Thread generating tool
5 Shank
6 Face side
7 Polygon
8 Front portion
9 Rear portion
10 Groove generating tool
14 Thread generating tool
20 Core hole
21 Core hole wall
22, 24 Groove
22B, 24B Groove base
23, 25 Wall region
32, 34 Thread generating region
32-1, 32-2 Pressing lobe
32-3 Pressing lobe
32A, 34A Thread-cutting tooth
32B, 34B Free surface
32C, 34C Rake surface
32E, 34E Side region
32F, 34F Flattening
32G, 34G Tooth tip
33, 35 Outer surface
36 Thread flight
36F Thread base
42, 44 Groove generating region
42A, 44A Groove cutting edge
42B, 44B Free surface
42C, 44C Rake surface
42D, 44D Front side cutting edge
42E, 44E Rear side region
42F, 44F Front surface
42G, 44G Shaping spine
42G', 44G' Front profile
42H, 44H Back surface
42I, 44I Maximum
42I', 44I' Maximum
42J, 44J Flank
42J', 44J' Flank
42K, 44K Flank
42K', 44K' Flank
42L, 44L End point
42L', 44L' End point
42M, 44M End point
42M', 44M' End point
43, 45 Outer surface
50 Duct
51 Central region
52, 54 Bulge
55 Drilled region
56 Cut region
62, 64 Bulge
142, 144 Groove generating ridge
A Tool axis
B Lobe axis
D Core hole diameter
E, F Thread diameter
d Tool diameter
g Gap width
S Direction of rotation
M Central axis
P Thread pitch
PN Groove twist pitch
t Groove depth
r Radius
$r_0, r_1, r_2$ Radius
h Radial height
$\Delta r$ Radial spacing
$L_1, L_2$ Axial length
$\alpha$ Angle of rotation
$\Delta\alpha$ Angle of rotation correction
$\beta, \beta'$ Angle component
$\gamma$ Angle component
$\delta, \epsilon$ Angle
$\theta$ Groove twist angle
$\phi$ Thread pitch angle

We claim:
1. A method for producing a thread in a workpiece, said method comprising the following method steps:
 a) generating a number $n \geq 1$ of twisted grooves in a wall of the workpiece encircling a thread axis,
 b) respectively inserting a thread generating region of a tool which is twisted to match the twisting of the twisted grooves into each of the twisted grooves in a twisted insertion movement matched to the twisting of the associated groove,
 c) generating a thread in each wall sub-region, adjoining the grooves, of the wall of the workpiece by rotating the tool about the thread axis and with a simultaneous axial feed motion of the tool coaxially with respect to the thread axis with an axial feed speed adapted to the rotational speed of the rotational movement and to the thread pitch, wherein, during the rotation and the simultaneous axial feed movement, each thread generating region engages into the associated wall sub-region and generates an associated part of a thread flight, and after the rotation projects into the same groove again or into another groove in the wall, d) wherein the grooves and the thread are generated using a single tool,
e) the tool, for this purpose having additionally at least one twisted groove generating region in addition to the at least one twisted thread generating regions, each groove generating region and each thread generating region have the same twisting both in the direction in which they turn about the thread axis or tool axis and in the twist pitch or in the twist angle,
f) wherein either exclusively the groove generating regions generates or generate the grooves or else the thread generating regions additionally reworks or rework or also generates or also generate the grooves generated by the groove generating regions,
g) moving each thread generating region of the tool out of the associated groove in a twisted removal movement matched to the twisting of the associated twisted groove.

2. The method as claimed in claim 1 wherein the tool is rotated about a predefined angle of rotation during the generation of the thread, and wherein one of:
a) the angle of rotation during the generation of the thread corresponds to the sum of an angular interval between two grooves, on the one hand and a correction term which is proportional to the quotient (P/(PN−P)) of the thread pitch (P) of the thread to be generated and the difference between the twist pitch (PN) of the grooves and the thread pitch of the thread to be generated, the thread pitch (P) and the twist pitch (PN) being chosen to be positive in the case of a right-handed thread or a right-handed twist and to be negative in the case of a left-handed thread or left-handed twist, on the other hand;
b) the angle of rotation during the generation of the thread is chosen in such a way that after the rotation each thread generating region projects into a groove which is directly adjacent to the groove into which the thread generating region projects before the rotation;
or
c) the n grooves are generated in the same angular interval of 360°/n in relation to one another, and in which the angle of rotation is obtained from an integral multiple of the sum of 360°/n on the one hand and a correction term which corresponds to the product of 360°/n on the one hand and the quotient (P/(PN−P)) of the thread pitch (P) of the thread to be generated and the difference between the twist pitch (PN) of the grooves and the thread pitch (P) of the thread to be generated, on the other hand, the thread pitch (P) and the twist pitch (PN) being chosen to be positive in the case of a right-handed thread or a right-handed twist and to be negative in the case of a left-handed thread or left-handed twist.

3. The method as claimed in claim 1, in which, upon insertion into the associated groove, the thread generating region projects in a radial direction in relation to the thread axis into the associated groove, maintaining a radial spacing from the groove base and also a spacing from the groove flanks.

4. The method as claimed in claim 1, wherein:
a) at least some of the thread generating regions of the thread generating tool have thread pressing lobes arranged on a helical line, which corresponds in terms of thread pitch to the thread to be generated, about the tool axis, which thread pressing lobes project radially furthest outward within the thread generating region, and/or
b) at least one thread generating region is a thread cutting region and generates its part of the thread flight by a cutting process, and/or
c) some of the thread generating regions of the thread generating tool have thread-cutting teeth arranged on a helical line, which corresponds in terms of thread pitch to the thread to be generated, about the tool axis, which thread-cutting teeth project radially furthest outward within the thread generating region, wherein the thread-cutting teeth are adjoined in a direction opposite to the cutting direction or direction of rotation by outer free surfaces.

5. The method as claimed in claim 1, in which the wall of the workpiece in which the thread is generated is a core hole wall of a core hole in the workpiece.

6. The method as claimed in claim 1, wherein one of:
a) the outer profile of only one thread-cutting tooth or thread shaping wedge of the thread generating region already defines the final thread profile of the thread flight portion generated by said tooth or wedge;
b) the thread is generated with at least two axially offset thread sub-regions with different thread profiles, wherein any desired thread profiles can be combined in any desired sequence;
c) a first thread sub-region has a thread profile with at least partially smaller dimensions or outer dimensions than a second thread sub-region;
d) the first thread sub-region is a front thread sub-region and the second thread sub-region is a rear thread sub-region, wherein the front thread sub-region is situated in front of the rear thread sub-region axially or in the feed direction;
e) in its thread profile, the first, thread sub-region has a flattening in the thread base;
f) the second thread sub-region has a thread profile which has a radially further outwardly situated thread base than the thread profile of the first, thread sub-region; or
g) the diameter of a thread sub-region is smaller than the diameter of another thread sub-region.

7. A tool for producing a thread in a workpiece having the following features:
a) the tool is rotatable about a tool axis,
b) the tool has a number n≥1 of groove generating regions twisted about the tool axis for generating a respective groove in the workpiece and a number m≥1 of helical thread generating regions twisted about the tool axis for generating the thread in the workpiece,
d) each of the m thread generating regions is arranged
c) the twisting of the groove generating regions and the twisting of the thread generating regions are matched to one another,
downstream of one of the n groove generating regions, following the twisting of this groove generating region,
e) at least some of the thread generating regions of the thread generating tool have thread pressing lobes and/or thread-cutting teeth arranged on a helical line, which corresponds in terms of thread pitch and turning direction to the thread to be generated, about the tool axis, which thread pressing lobes and/or thread-cutting teeth project radially furthest outward within the thread generating region.

8. The tool as claimed in claim 7, in which at least one or each of the m thread generating regions has, in cross section, a smaller extent in a projection following the twisting than the groove generating region arranged in front of it or in which at least one or each of the m thread generating regions has, in cross section, at least in part an identical or greater extent in a projection following the twisting than the groove generating region arranged in front of it.

9. The tool as claimed in claim 7, in which at least some of the n groove generating regions are formed as cutting groove generating regions with groove generating cutting edges, wherein the groove generating cutting edges are formed as reaming cutting edges and/or are arranged on a face side of the tool.

10. The tool as claimed in claim 7, wherein one of:
a) at least some of the n groove generating regions are formed as groove generating regions which operate in a non-cutting manner and/or which operate by plastic deformation or impression of the workpiece material;
b) each groove generating region has a shaping spine which runs substantially in a circumferential direction around the tool axis and which, as viewed axially or in a twisting direction, is the radially highest elevation of the groove generating region and/or projects radially furthest outward;
c) in front of the shaping spine axially or in a twisting direction, each groove generating region has a front surface;
d) the front surface rises in a twisting direction or axially to the shaping spine from a front profile which is situated radially further inward than the shaping spine and which is arranged on the face side of the tool;
e) the front surface forms a run-on surface by means of which the groove generating region presses into the workpiece surface for the first time and with slowly increasing deformation force;
f) behind the shaping spine in a twisting direction or axially, each groove generating region has a back surface which slopes downward from the shaping spine in a twisting direction or axially;
g) the shaping spine has a maximum which projects radially furthest outward, and said shaping spine slopes downward radially from the maximum in one circumferential direction in one flank to a first end point which is situated radially further inward than the maximum, and in the other circumferential direction in a further flank to a second end point which is situated radially further inward than the maximum;
h) one end point is situated radially further inward than the other end point and/or one flank is shorter than the other flank;
i) the front profile has a similar shape to the shaping spine with a maximum and two flanks sloping downward from the maximum to end points;
j) the front surface connects corresponding maxima of the shaping spine and front profile and/or corresponding end points and/or corresponding flanks; or
k) the front surface runs between the front profile and the shaping spine in a twisting direction or axially in a substantially linear or convexly inwardly curved manner or following an arbitrary continuous radial function.

11. The tool as claimed in claim 7, wherein one of:
a) the n groove generating regions are arranged at uniform angular intervals of 360°/n relative to one another about the tool axis;
b) the angle component β of one or each groove generating region and of the thread generating regions, situated therebehind, about the tool axis is between 7.2° and 45°;
c) the thread generating regions project radially further outward than the other outer surfaces of the thread generating tool; or d) the groove generating regions and/or the thread generating regions are fastened detachably or exchangeably to a tool carrier.

12. The tool as claimed in claim 7, wherein:
a) at least one thread generating region is a thread shaping region and generates its part of the thread flight by a shaping and thus non-cutting process, and/or
b) the thread pressing lobes project radially outward to a lesser extent than the groove generating regions.

13. The tool as claimed in claim 7,
in which the thread-cutting teeth are arranged and formed so as to cut in the turning direction of the thread to be generated and of the helical line about the tool axis on which the thread-cutting teeth are arranged,
or
in which the thread-cutting teeth are arranged and formed so as to cut oppositely to the turning direction of the thread to be generated and of the helical line about the tool axis on which the thread-cutting teeth are arranged.

14. The tool as claimed in claim 7, wherein one of:
a) at least one groove generating region has a groove cutting edge oriented toward or situated on the face side;
b) the groove cutting edges are the radially furthest outward projecting regions of the tool, at least in the front portion thereof;
c) the groove cutting edges are of at least approximately circular form;
d) the radius of the groove cutting edges is greater by a differential radius than the radius of the first thread generating sub-region;
e) the groove cutting edge is adjoined laterally in a circumferential direction by a side cutting edge, which is at the front in the direction of rotation about the tool axis, and by a side region which is at the rear in the direction of rotation about the tool axis;
f) during the rotation of the tool in the direction of rotation—which takes place for the generation of the thread, the front side cutting edge cuts laterally into the workpiece, wherein there adjoins in a radially inward direction a lateral rake surface;
g) the rear side region is, by contrast, at an obtuse angle, that is to say does not have cutting action and is of convex form;
h) behind the groove cutting edge in a twisting direction there adjoins a free surface which slopes downward from the radius to a radius smaller than the radius of the first pressing lobe or of the first thread generating sub-region;
i) the groove cutting edge is adjoined in a radially inward direction by a face-side rake surface which runs axially or in a twisting direction rearward in a linear or else concavely curved fashion and on which chips produced during the generation or reaming of the groove with the groove cutting edge are discharged; or
j) the face-side rake surface runs from a lowest point axially or in a twisting direction forward again to a planar central region oriented perpendicular to the tool axis, which central region surrounds a central opening of a central duct of the tool, via which central duct coolant and/or lubricant can be supplied.

15. A tool as claimed in claim 7, wherein one of:
a) the tool is rotatable about a tool axis and has a number m≥1 of thread generating regions twisted about the tool axis for generating a thread in a workpiece;
b) the threading tool comprises a shank which has a rear portion, which is for example of cylindrical form, and a front portion which is narrowed in diameter adjacent to the rear portion and centrally through which the tool axis extends;

c) at the end of the rear portion there is formed a clamping region for the clamping of the shank;

d) the front portion has, toward the face side which faces away from the rear portion or which is arranged at the front, the m thread generating regions;

e) the m thread generating regions are in the form of twisted rows, running in each case in a manner twisted about the tool axis, of thread generating ridges which, in the case of m=2, are arranged diametrically with respect to one another on opposite sides of the tool axis;

f) the thread generating ridges run along the thread pitch of the desired thread and have in each case one pressing lobe, which projects radially furthest outward in relation to the tool axis, for the plastic impression of the thread flight into the workpiece;

g) the outer radii of different thread generating ridges or pressing lobes of the two thread generating regions are equal to one another over the entire length;

h) the thread generating regions are separated by interposed outer surfaces which have a smaller outer radius than the thread generating regions, that is to say are recessed radially with respect to said thread generating regions, and/or form free spaces between the thread generating regions;

i) the thread generating regions cover in each case a first angle range and the outer surfaces cover in each case a second angle range, wherein the first angle range lies in an interval from one to 2.5 times the second angle range and/or wherein the pressing lobes are situated centrally in the respective angle ranges; or j) the outer surfaces have a convex, outwardly directed bulge.

16. The tool as claimed claim 7, wherein one of:

a) the outer profile of only one thread-cutting tooth or thread shaping wedge already defines the final thread profile of the thread flight portion generated by said tooth or wedge;

b) the thread generating regions are divided into offset thread generating sub-regions with different thread outer profiles;

c) a first thread generating sub-region which is situated in front of a rear thread generating sub-region in a direction toward the face side, has a thread outer profile with at least partially smaller dimensions or outer dimensions than a second thread generating sub-region;

d) each first thread generating sub-region, in its thread outer profile, a flattening at the profile tip;

e) each second thread generating sub-region has an outer profile which has a radially further outwardly projecting profile tip than the first thread generating sub-region; or f) the diameter of a thread generating sub-region is smaller than the diameter of another thread generating sub-region.

17. The tool as claimed in claim 7, wherein:

a) at least one thread generating region is a thread cutting region and generates its part of the thread flight by a cutting process, and/or b) the thread-cutting teeth project radially outward to a lesser extent than the groove generating regions, wherein the thread-cutting teeth are adjoined in a direction opposite to the cutting direction or direction of rotation by outer free surfaces.

18. A method for producing a thread in a workpiece, said method comprising the following method steps:

a) generating a number $n \geq 1$ of twisted grooves in a wall of the workpiece encircling a thread axis or generating a wall of the workpiece which has a number $n \geq 1$ of twisted grooves and encircles a thread axis, b) respectively inserting a thread generating region of a tool which is twisted to match the twisting of the twisted grooves into each of the twisted grooves in a twisted insertion movement matched to the twisting of the associated groove, c) generating a thread in each wall sub-region, adjoining the grooves, of the wall of the workpiece by rotating the tool about the thread axis and with a simultaneous axial feed motion of the tool coaxially with respect to the thread axis with an axial feed speed adapted to the rotational speed of the rotational movement and to the thread pitch, wherein, during the rotation and the simultaneous axial feed movement, each thread generating region engages into the associated wall sub-region and generates an associated part of a thread flight, and after the rotation projects into the same groove again or into another groove in the wall, d) wherein at least one groove is generated by a non-cutting process, using a groove generating tool or groove generating region of a tool which moves in the direction of the desired groove and operates by a non-cutting process, e) wherein at least one thread generating region is a thread forming region and generates its part of the thread flight by a forming and thus non-cutting process, f) moving each thread generating region of the tool out of the associated groove in a twisted removal movement matched to the twisting of the associated twisted groove.

19. The method as claimed in claim 18, wherein one of:

a) each twisted groove is generated substantially as a groove running helically about the thread axis;

b) each thread generating region runs substantially helically about the thread axis during the generation of the thread;

c) the groove twist pitch (PN) is chosen to be considerably greater than the thread pitch (P), generally at least four times greater;

d) the groove twist angle is chosen to be considerably greater than the thread pitch angle, the angles being measured in each case with respect to the cross-sectional plane perpendicular to the thread axis and tool axis, respectively;

e) the groove twist angle lies in a range between 2° and 70°; or f) the twisting directions or turning direction of grooves and threads about the thread axis are the same.

20. The method as claimed in claim 18, wherein the wall of the workpiece and the grooves in the wall are generated together in a machining method step or using one machining tool.

* * * * *

UNITED STATES PATENT AND TRADEMARK OFFICE
CERTIFICATE OF CORRECTION

PATENT NO. : 9,662,728 B2
APPLICATION NO. : 14/407830
DATED : May 30, 2017
INVENTOR(S) : Glimpel et al.

Page 1 of 1

It is certified that error appears in the above-identified patent and that said Letters Patent is hereby corrected as shown below:

In the Specification

Column 4
Line 30, change "the time saving during" to --the time saved during--
Line 32, change "formed in accurately" to --formed accurately--
Line 67, insert --.-- after "present application"

Column 18
Line 63, change "34-1" to --34-2--

Column 24
Line 55, change "FIG. 24" to --FIG. 21--

Column 25
Line 8, change "FIGS. 22 or 24" to --FIG. 22--

In the Claims

Column 28
Line 48, remove --d) each of the m thread generating regions is arranged--
Line 52, insert --d) each of the m thread generating regions is arranged-- before "downstream"

Column 32
Line 41, change "as claimed in claim 18" to --as claimed in claim 1--
Line 59, change "as claimed in claim 18" to --as claimed in claim 1--

Signed and Sealed this
Third Day of July, 2018

Andrei Iancu
*Director of the United States Patent and Trademark Office*